United States Patent [19]
Okamoto et al.

[11] Patent Number: 6,094,442
[45] Date of Patent: Jul. 25, 2000

[54] OPTICAL PATH SIGNAL TERMINATION EQUIPMENT

[75] Inventors: Satoru Okamoto, Yokoyama; Kenichi Satou, Yokohama, both of Japan

[73] Assignee: Nippon Telegraph and Telephone Corporation, Shinju-ku, Japan

[21] Appl. No.: 08/968,095

[22] Filed: Nov. 12, 1997

[30] Foreign Application Priority Data

Nov. 13, 1996 [JP] Japan ................................. 8-302112

[51] Int. Cl.[7] .............................. H04J 3/07; H04J 3/04; H04J 14/08; H04B 10/08
[52] U.S. Cl. .......................... 370/506; 370/535; 359/110; 359/135
[58] Field of Search ..................... 370/412, 428, 370/429, 466, 476, 445, 392, 396, 506, 535; 359/135, 139, 124, 110, 115, 117

[56] References Cited

U.S. PATENT DOCUMENTS

| | | | |
|---|---|---|---|
| 5,251,204 | 10/1993 | Izawa et al. | 370/15 |
| 5,383,046 | 1/1995 | Tomofuji et al. | 359/176 |
| 5,555,262 | 9/1996 | Urbansky | 370/102 |
| 5,572,515 | 11/1996 | Williamson et al. | 370/17 |
| 5,581,386 | 12/1996 | Suzuki | 359/117 |

FOREIGN PATENT DOCUMENTS 9-247106  9/1997  Japan .

OTHER PUBLICATIONS

"Evolution of Path Layer Techniques Toward Photonic Networks", pgs. 3–292–3–293, Sato et al., NTT Transmission Systems Laboratories, 1992.

"Photonic Transport Network OAM Technologies", pgs. 86–94, Ken–ichi–Sato, NTT Optical Network Systems Laboratory, IEEE Communications Magazine, Dec. 1996.

"Photonic Trasport Network Architecture Employing Optical Path Concept", pgs. 1–8, Oguchi et al., NTT Optical Network Systems Laboratories, ICC '97 Workshop on WDM Network Management.

"Inter–Network Interface for Photonic Transport Networks and SDH Transport Networks", Okamoto et al., NTT Optical Network Systems Laboratories, IEEE Globe CCM '97.

"Characteristics of Synchronous Digital Hierarchy (SDH) Equipment Functional Blocks", pgs. 1–75, International Telecommunication Union, G.783, (Jan. 1994).

Digital Transmission Systems—Terminal Equipments—General, pgs. 1–129, International Telecommunication Union, G.707 (Mar. 1996).

"Network Architecture for Optical Path Transport Networks", pg. 1–10, Okamoto et al., IEEE Transactions on Communications, vol. 45, No. 8, Aug. 1997.

"Optical Path Layer Technologies to Enhance B–ISDN Performance", pgs. 1300–1307, Sato et al., IEEE Communications Society, IEEE International Conference on Communications ICC '93, May 23–26, 1993.

"Network Architecture and Management Concepts for Optical Transport Networks", pgs. 1–11, Okamoto et al., NTT Optical Network Systems Laboratories, IEEE, 1996.

*Primary Examiner*—Alpus H Hsu
*Assistant Examiner*—Duc Ho
*Attorney, Agent, or Firm*—Pillsbury Madison & Sutro LLP

[57] ABSTRACT

In optical path signal termination equipment which converts between an SDH signal transmitted at the electrical level and an optical path signal transmitted at the optical level, an optical path supervisory signal is inserted in the optical path signal without increasing the signal length. This is accomplished by utilizing the SDH section supervisory signal area contained in the SDH signal as the area for the optical path supervisory signal in the optical path signal.

16 Claims, 18 Drawing Sheets

OPTICAL PATH SIGNAL TERMINATION EQUIPMENT

This application claims priority from foreign application Japan 8-302112, filed Nov. 13, 1996, which is incorporated by reference herein.

BACKGROUND OF THE INVENTION

1. Field of the Invention

The present invention relates to techniques for accommodating synchronous digital hierarchy (SDH) signals in an optical path network. It relates in particular to conversion between SDH signals transmitted at the electrical level and optical path signals transmitted at the optical level.

2. Description of Related Art

Wavelength division multiplexing (WDM) techniques, which make full use of the broadband nature of light, and optical path networks, which introduce wavelength routing into the path layer, have both been undergoing rapid development. It might be assumed that existing SDH, ATM and PDH (plesiochronous digital hierarchy) networks will all be accommodated in optical path networks. However, PDH networks are currently being replaced by SDH networks, and the majority of ATM networks are SDH-based systems which accommodate ATM cells in SDH paths. Therefore, the central task is the accommodation of SDH signals in optical path networks.

FIG. 1 illustrates a conventional switched network connecting subscriber terminals. Subscribers 11 and 18 are connected via switch 12, transit switch 13, line terminators 14 and 15, transit switch 16, and switch 17. Subscriber 11 and switch 12 are connected by, for example, a 64 kb/s channel, as are switch 17 and subscriber 18. Switch 12, transit switch 13 and line terminator 14 (and line terminator 15, transit switch 16 and switch 17) are connected by, for example, 52 Mbit/s paths comprising time division multiplexed 64 kb/s channels. Transmission between line terminators 14 and 15 involves further multiplexing of these paths.

FIG. 2 illustrates the connection of SDH signal paths via an SDH path cross-connect. Transit switches 21-1 to 21-4 are respectively connected to SDH path cross-connect 25 via line terminators 22-1 to 22-4 and 23-1 to 23-4. FIG. 2 shows a single path from transit switch 21-1 to each of transit switches 21-2 to 21-4, and in general transmission between line terminators 22-1 to 22-4 and 23-1 to 23-4 is carried out on the basis of time division multiplexed paths, with the direction of individual paths being set by SDH cross-connect 25.

FIG. 3 illustrates how some of the path connections shown in FIG. 2 are realized in an optical path network. In this case, optical path terminators 26-1 to 26-3 are used instead of line terminators, and these optical path terminators 26-1 to 26-3 are each connected to optical path cross-connect 27 via wavelength division multiplexed links. Optical paths can be established as desired between optical path terminators 26-1 to 26-3, and these optical paths are accommodated in the wavelength division multiplexed links using WDM techniques. A detailed account of such optical path networks is given in, for example, K. Sato and S. Okamoto, "Evolution of Path Layer Techniques Toward Photonic Networks", IEICE Japan Autumn Meeting, September 1992, SB-7-1, and K. Sato, S. Okamoto, and H. Hadama, "Optical Path Layer Technologies to enhance B-ISDN performance", Proc. IEEE ICC'93, June 1993, pp.1300–1307.

An optical path signal comprises a main signal and an optical path supervisory signal. Two types of signal are used as the supervisory signal. The first type is an optical path supervisory signal which is multiplexed at the electrical level in the same frequency band as the main signal. This type is primarily used for supervising the quality of the main signal. The second type is an optically added optical path supervisory signal which is multiplexed at the optical level in a different frequency band from the main signal or is superimposed onto the main signal by a modulation separate from that used for the main signal. This second type is primarily used for management and identification of the type of main signal. (See S. Okamoto, K. Oguchi and K. Sato, "Network architecture and management concepts for optical transport networks", Proceedings on IEEE/IFIP 1996 Network Operations and Management Symposium (NOMS '96), pp.1–11, April 1996, and Japanese Patent Application 8-49751, "Method for supervision of wavelength multiplexed optical communications" (not yet laid open at the time of filing of the present application)).

Thus, when an optical path signal is wavelength multiplexed and transmitted through WDM links, an optical path supervisory signal and a wavelength multiplexed optical path supervisory signal are transmitted along with it, these supervisory signals being contained in part of the optical path signal. The optical path supervisory signal and the wavelength multiplexed optical path supervisory signal are monitored, and if a fault occurs in an optical fiber or some transmission equipment, path restoration is performed by re-establishing the optical path along a route which detours around the location of the fault.

An explanation will now be given of the SDH transmission scheme. In SDH transmission, the unit of information transfer is the virtual container (VC), which comprises payload (information to be transmitted) and a "path overhead" which is added to this payload. When VC signals are to be accommodated in a transmission medium such as an optical fiber, a frame called a "synchronous transfer module" (hereinafter, STM) is formed. An administrative unit (AU) signal is formed by first adding pointers (AU pointers) to the VC signals in order to manage differences in the alignment of the VC signals with respect to the STM frame, and then time division multiplexing the VC signals. An STM-N signal is formed by time division multiplexing N of these AU signals and adding a section supervisory signal. After electrical to optical conversion of this STM-N signal has been accomplished, it is sent to the optical fibre. The reverse processing is carried out at a receiving terminal (see ITU-T Recommendation G.707, "Digital transmission system-Terminal equipments-General" and ITU-T Recommendation G.783, "Characteristics of synchronous digital hierarchy (SDH) equipment functional blocks"). When SDH signals are transmitted in wavelength multiplexed form, a plurality of STM-N signs are transmitted after being converted to optical signals of different wavelengths.

When a fault occurs somewhere in the transmission medium or in some transmission equipment, path restoration is performed by re-routing VCs around the location of the fault. It is stipulated that when a fault occurs, the termination equipment adjacent to the fault location maintains alignment with respect to the frame by generating STM-N or VC signals in which every bit is a logical "1" and using these as a substitute for the lost signal. In this case, because the SDH path supervisory signals in the VCs will not have valid values, faults can be detected in individual VCs and succeeding VCs re-routed.

The conventional signal format for accommodating an SDH signal in an optical path network will be explained with reference to FIG. 4 to FIG. 7. FIG. 4 shows the format of a VC signal, FIG. 5 the format of an STM-N signal, FIG. 6 the format of an AU signal, and FIG. 7 the format of an optical path signal. In these signal format diagrams, the direction of time elapse is from left to right along the horizontal axis. In addition to being read from left to right, the signals are also read vertically, so that reading starts at the top left of the frame and finishes at the bottom right (all subsequent drawings showing signal format will follow this pattern).

Different sizes of virtual container are defined, each capable of accommodating a different transmission rate. These different VCs are known as VC-11, VC-12, VC-2, VC-3, VC-4, VC-4-4c and VC-4-16c. FIG. 4 shows the format of a VC-4 signal. It will be seen that this comprises a 260×9 byte payload area P and a 9 byte path supervisory signal area PO. An STM-N signal comprises multiplexed VC signals of this sort. More precisely, as shown in FIG. 5, an STM-N signal has a 9×(261×N) byte payload area, a 3×(9×N) byte section supervisory signal area S1, a 5×(9×N) byte section supervisory signal area S2, and a 1×(9×N) byte AU pointer area a.

The signal format of a conventional optical path signal differs from that of an STM-N signal in the SDH transmission scheme. It is therefore necessary, when transferring an SDH signal through an optical communication network, to convert the SDH signal format to an optical path signal format.

Namely, when an STM-N signal is to be accommodated in an optical path, the signal has to be made longer and its transmission speed increased so that, as shown in FIG. 7, an optical path supervisory signal area can be provided and an optical path supervisory signal inserted therein.

There is also the problem that when a fault occurs within the optical communication network, two kinds of path restoration are required; namely, alternative routing of optical paths within the optical communication network, and alternative routing of VC signals in the SDH. As a result, increased network resources are needed.

The present invention has been devised in the light of this situation, and it is an object of this invention to provide optical path signal termination equipment capable of inserting an optical path supervisory signal without increasing signal length.

SUMMARY OF THE INVENTION

According to a first aspect, this invention is optical path signal termination equipment for use as the transmitting terminal of an optical path terminator. As such, it comprises: an electrical signal termination means for terminating one or more SDH signals which have been transmitted by electrical signals, and for outputting an electrical signal for sending to the optical path; and an optical path termination means for inserting an optical path supervisory signal at the electrical level into this electrical signal, converting the resulting signal into an optical signal, and outputting this as the optical path signal. The optical path termination means includes means for inserting the optical path supervisory signal in place of the SDH section supervisory signal contained in the SDH signal.

The electrical signal termination means preferably comprises: one or more means for respectively processing the SDH section supervisory signal or signals contained in the one or more SDH signals; one or more demultiplexing means for respectively demultiplexing the SDH signal or signals thus processed, thereby converting it (or them) to a plurality of VC signals; and multiplexing means for multiplexing the plurality of VC signals output by this (or these) demultiplexing means, converting them to AU signals by adding AU pointers, further multiplexing the plurality of AU signals thus obtained, and outputting an electrical signal with an optical path signal format. The insertion means preferably inserts the optical path supervisory signal at the electrical level in a predetermined area of this electrical signal with an optical path signal format. In particular, it preferably inserts the optical path supervisory signal at the electrical level in an area which corresponds to the area for the SDH section supervisory signal in the SDH signal format (termed the "section overhead").

It is feasible to provide a plurality of optical path termination means, to provide a multiplexing means in correspondence with each of these plurality of optical path termination means, and to provide between these multiplexing means and the demultiplexing means a switching circuit for switching signals. It is also feasible to provide a plurality of multiplexing means and optical path termination means, but for the switching circuit for switching signals to be provided between the outputs of the multiplexing means and the inputs of the optical path termination means.

The optical path termination means preferably includes means for adding to the optical path signal an optical path supervisory signal at the optical level, this signal being separate from the optical path supervisory signal at the electrical level. This adding means may be configured to wavelength division multiplex the optical path signal and the optical path supervisory signal at the optical level, or it may be configured to apply to the optical path signal a modulation separate from that used for the main signal.

According to a second aspect, this invention is optical path signal termination equipment for use as the receiving terminal of an optical path terminator. As such, it comprises: an optical path termination means for receiving an optical path signal and converting it to an electrical signal; and an electrical signal termination means for converting the electrical signal output by this optical path termination means to one or more SDH signals and outputting this (or these) signal. The optical path signal has a signal format which does not contain the SDH section supervisory signal of the SDH signal, and the electrical signal termination means includes one or more means which respectively insert an SDH section supervisory signal in place of the optical path supervisory signal contained in the optical path signal received by the optical path termination means.

The optical path termination means preferably includes means which, after the optical path signal has been converted to an electrical signal, extracts the optical path supervisory signal at the electrical level which has been added to the predetermined area of the electrical signal. The electrical signal termination means preferably includes: demultiplexing means for demultiplexing the electrical signal output by the optical path termination means, thereby converting it to a plurality of VC signals; multiplexing means for converting the plurality of VC signals output by the demultiplexing means to AU signals by multiplexing them and adding AU pointers; and means for respectively adding SDH section overheads to the AU signals output by the multiplexing means.

The optical path supervisory signal at the electrical level is added to the optical path signal in the area of the SDH section supervisory signal in the SDH signal format. The optical path termination means can be configured to output an electrical signal with an optical path signal format, the electrical signal containing this optical path supervisory signal at the electrical level. The electrical signal termination means can also comprise: demultiplexing means for demultiplexing the electrical signal output by the optical path termination means (the electrical signal including the optical path supervisory signal at the electrical level), thereby converting to a plurality of VC signals; means for respectively rewriting the SDH path supervisory signal areas contained in the plurality of VC signals output by the demultiplexing means; multiplexing means for multiplexing the outputs of these rewriting means and converting them to AU signals by adding AU pointers; and means for adding SDH section supervisory signals to the AU signals output by the multiplexing means.

It is feasible to provide a plurality of optical path termination means, to provide a demultiplexing means in correspondence with each of these plurality of optical path termination means, and to provide between the demultiplexing means and the multiplexing means a switching circuit for switching signals. It is also feasible to provide a plurality of optical path termination means and a plurality of demultiplexing means, but for the switching circuit for switching signals to be provided between the outputs of this plurality of optical path termination means and the inputs of the plurality of demultiplexing means.

The optical path termination means preferably includes means for separating from the optical path signal the optical path supervisory signal at the optical level, this signal being separate from the optical path supervisory signal at the electrical level.

An optical path terminator can have a plurality of the optical path signal termination equipment for use as transmitting terminals, and can be provided with wavelength multiplexing means which allocates an optical carrier of different wavelength to each of this plurality of optical path signal termination equipment, wavelength division multiplexes their respective output optical signals, and sends the result to the optical transmission line. An optical path terminator can also have a plurality of the optical path signal termination equipment for use as receiving terminals, and can be provided with wavelength demultiplexing means which allocates an optical carrier of different wavelength to each of this plurality of optical path signal termination equipment, demultiplexes the wavelength multiplexed optical signal from the optical transmission line, and outputs the results to the plurality of optical path signal termination equipment.

DETAILED DESCRIPTION OF PREFERRED EMBODIMENTS

Figure 8:
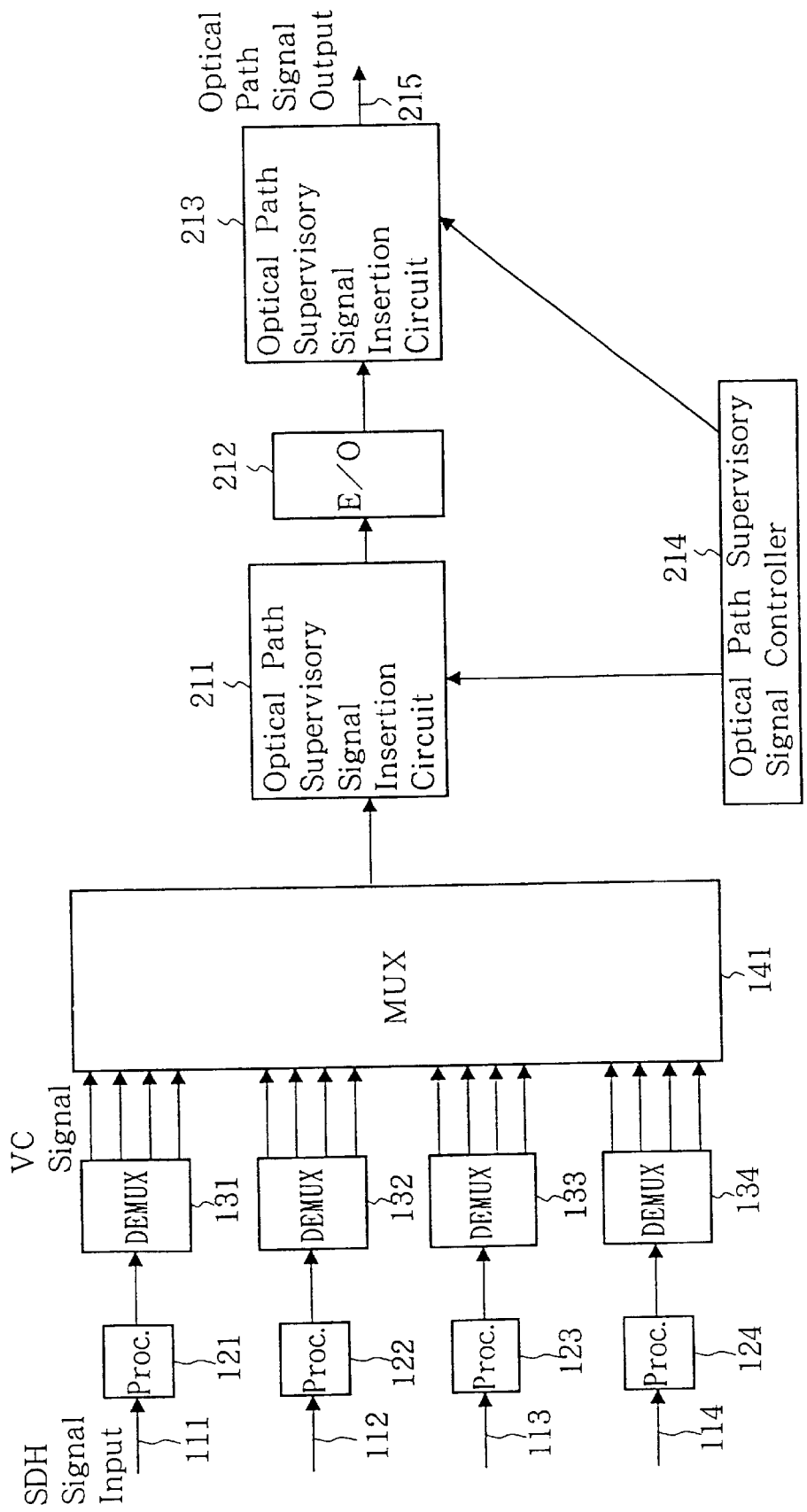
FIG. 8 is a block diagram of optical path signal termination equipment according to a first embodiment of the present invention.
Figure 9:
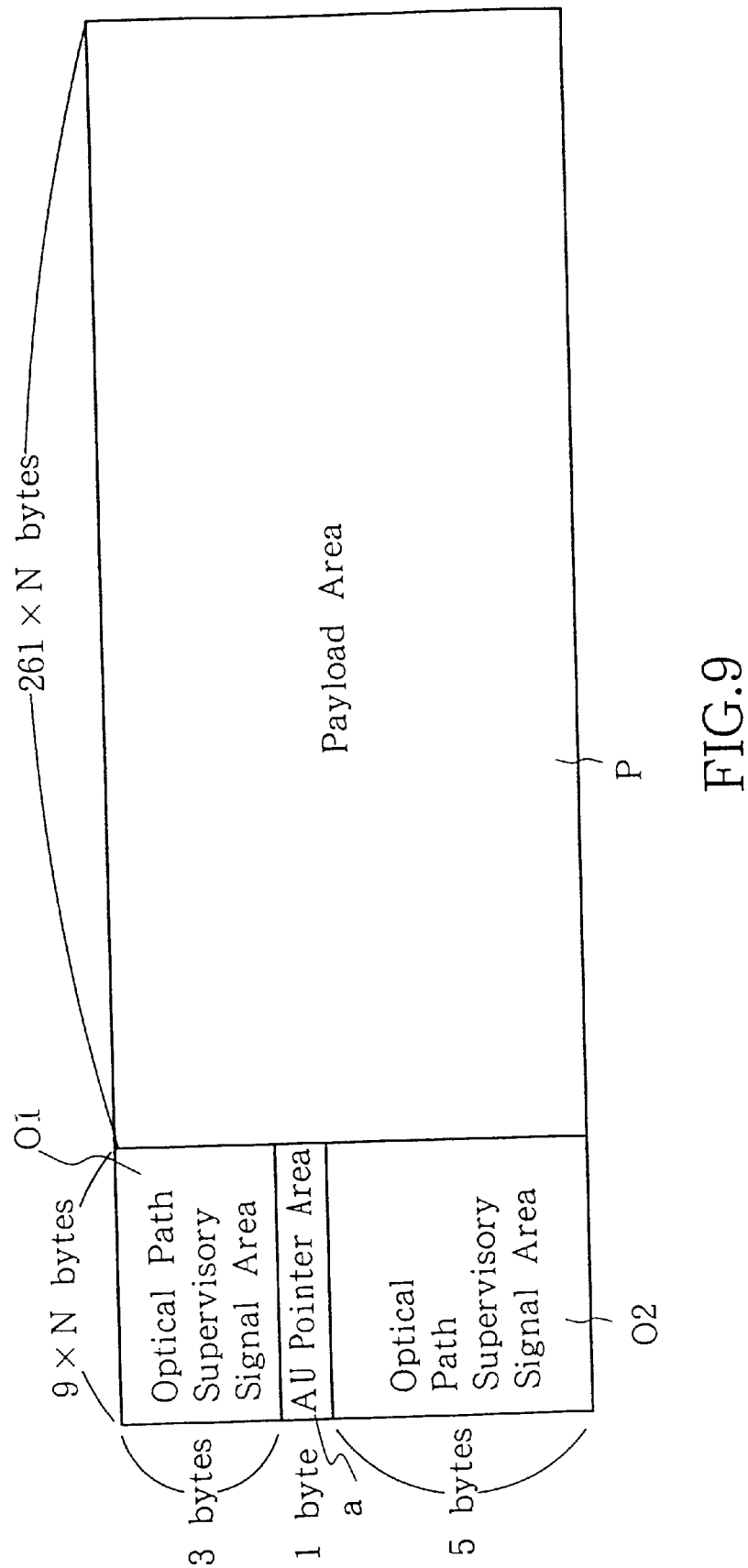
FIG. 9 shows the format of an optical path signal according to this invention.

The configuration of a first embodiment of this invention will be explained with reference to FIG. 8 and FIG. 9. FIG. 8 is a block diagram showing optical path signal termination equipment according to the first embodiment, while FIG. 9 shows the format of an optical path signal according to this invention.

This embodiment is used as a transmitting terminal of an optical path terminator. Specifically, this embodiment terminates one or more SDH signals which have been transmitted by electrical signals, and outputs an electrical signal for sending to an optical path. The embodiment comprises: input lines 111–114 at which the SDH signals arrive; SDH section supervisory signal processing circuits 121–124 for terminating these SDH signals and processing the SDH section supervisory signals contained therein; demultiplexing circuits 131–134 for demultiplexing the outputs of these SDH section supervisory signal processing circuits 121–124, thereby converting them to a plurality of VC signals; and multiplexing circuit 141 for converting the plurality of VC signals output from these demultiplexing circuits 131–134 to AU signals by multiplexing them and adding AU pointers, and then further multiplexing the plurality of AU signals thereby obtained and outputting an electrical signal in optical path signal format. In addition, in order to convert this electrical signal to an optical signal for output to the optical path, this embodiment comprises a first optical path supervisory signal insertion circuit 211 for inserting an optical path supervisory signal at the electrical level in place of the SDH section supervisory signal contained in the SDH signal; electrical to optical conversion circuit 212 for converting to an optical signal the electrical signal in optical path signal format to which an optical path supervisory signal at the electrical level has been added; a second optical path supervisory signal insertion circuit 213 for adding to the optical path signal an optical path supervisory signal at the optical level which is separate from the optical path supervisory signal at the electrical level; and optical path supervisory signal controller 214 for controlling the addition and multiplexing of optical path supervisory signals by the first and second optical path supervisory signal insertion circuits 211 and 213.

Figure 5:
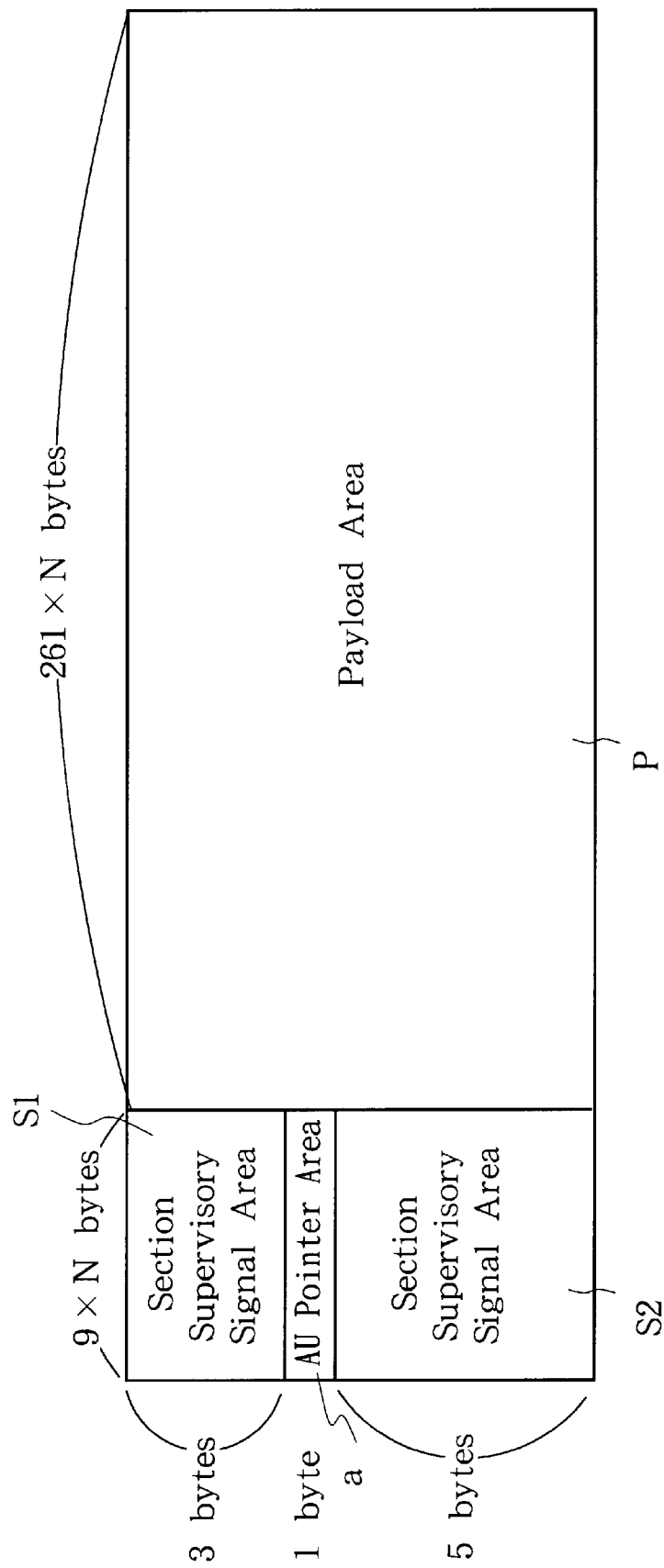
FIG. 5 shows the format of an STM-N signal.

As shown in FIG. 5, the SDH signals (i.e., STM-N signals) input to SDH signal input lines 111–114 each comprise 9×(270×N) bytes of data, which is subdivided into the following areas: section supervisory signal area S1 (3×(9×N) bytes), section supervisory signal area S2 (5×(9×N) bytes), AU pointer area a (1×(9×N) bytes), and payload area P (9×(261×N) bytes). SDH section supervisory signal processing circuits 121–124 perform the processing required to read the data of section supervisory signal areas S1 and S2. This processing is defined in ITU-T Recommendation G.708, "Network node interface for the synchronous digital hierarchy".

The SDH signals processed by SDH section supervisory signal processing circuits 121–124 are input to demultiplexing circuits 131–134. Each demultiplexing circuit 131–134 demultiplexes an STM-N signal into N signals, from each of which it extracts and outputs just the payload area P (the VC signal) (9×261 bytes). In the example illustrated, an STM-4 signal is input to each of SDH signal input lines 111–114, which means that four payload signals (VC signals) are output from each demultiplexing circuit 131–134.

Figure 6:
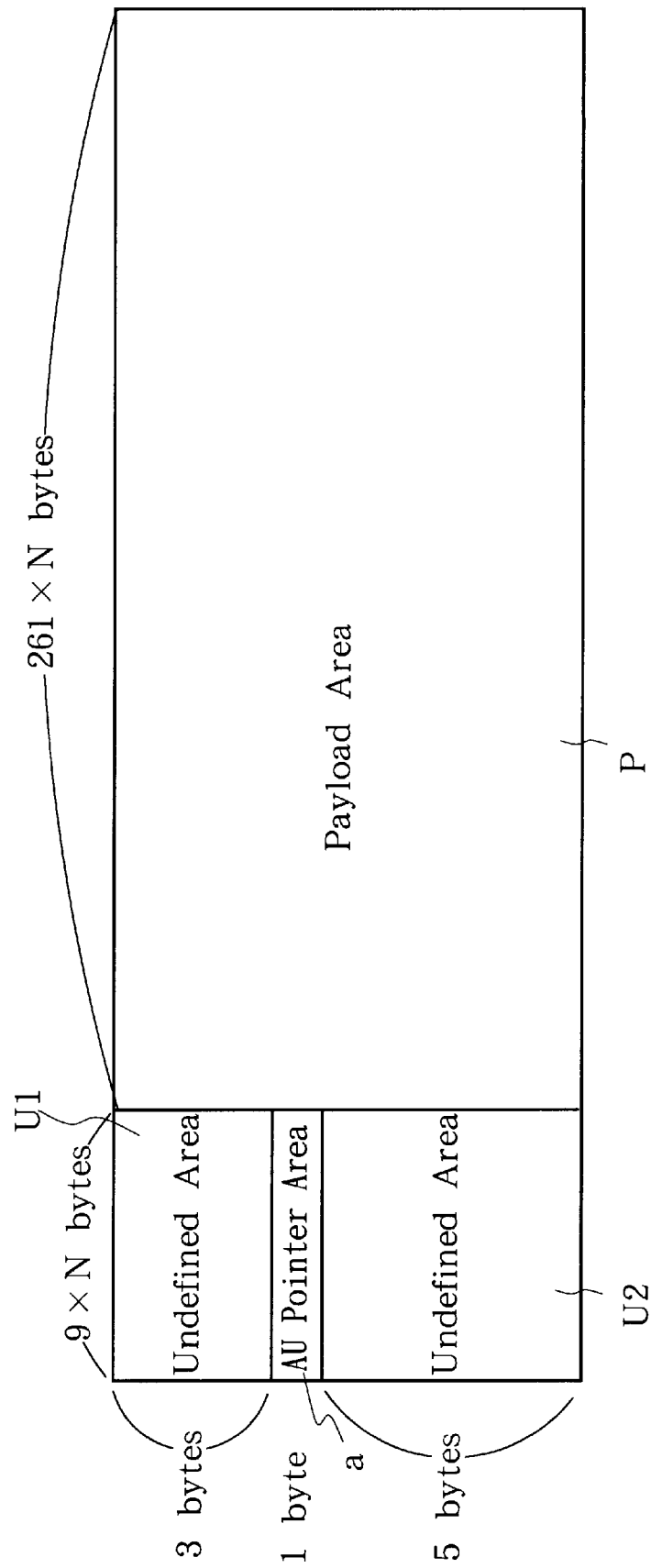
FIG. 6 shows the format of a conventional AU signal.
Figure 7:
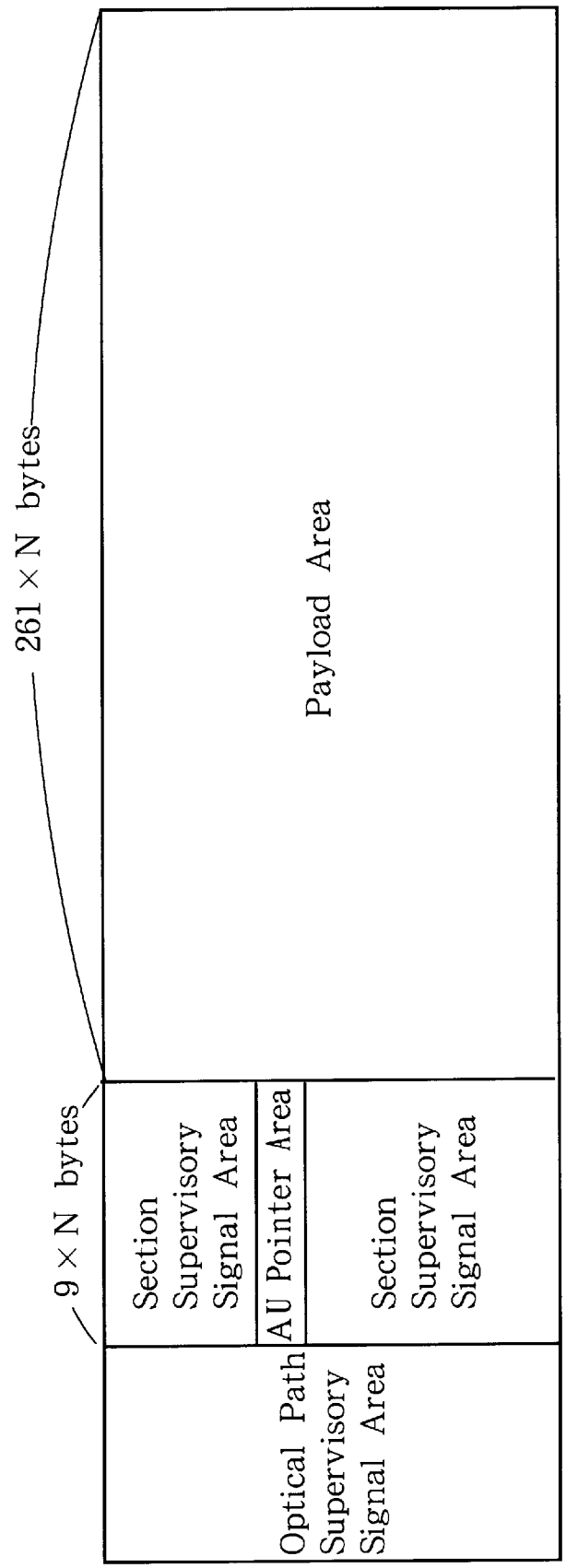
FIG. 7 shows the format of a conventional optical path signal.

The payload signals demultiplexed by demultiplexing circuits 131–134 are input to multiplexing circuit 141. Multiplexing circuit 141 adds AU pointers to the sixteen payload signals that have been input. As shown in FIG. 6, the format of a signal to which AU pointers have been added (i.e., an AU signal) comprises four areas: undefined area U1, undefined area U2, AU pointer area a, and payload area P. Multiplexing circuit 141 also performs byte-interleaved multiplexing of the sixteen AU signals.

The output of multiplexing circuit 141 is input to optical path supervisory signal insertion circuit 211. Optical path supervisory signal insertion circuit 211 inserts, into the input signal, an optical path supervisory signal that has been sent from optical path supervisory signal controller 214. The resulting signal is converted from an electrical signal to an optical signal by electrical to optical conversion circuit 212. Optical path supervisory signal insertion circuit 213 then inserts into this optical signal an optical path supervisory signal which has been sent from optical path supervisory signal controller 214.

As shown in FIG. 9, an optical path signal which is output from optical path supervisory signal insertion circuit 211 comprises the following four areas: optical path supervisory signal areas O1 and O2, AU pointer area a, and payload area P. In this example, N, the number of multiplexed VC signals, is sixteen.

In this embodiment, a circuit which multiplexes SDH signals is used as multiplexing circuit 141. As a result, the optical path signal has the format of an SDH signal, apart from the fact that an optical path supervisory signal is inserted instead of an SDH section supervisory signal. This invention can likewise be implemented using other formats for the multiplexing carried out by multiplexing circuit 141, provided that the signal format used corresponds to this. The important point is that an optical path supervisory signal is inserted instead of an SDH section supervisory signal.

Electrical to optical conversion circuit 212 is capable of setting different wavelengths for the output optical signal, and can be implemented, for example, by a tunable wavelength laser. However, it is also feasible to use a fixed wavelength for the output optical signal.

Figure 10:
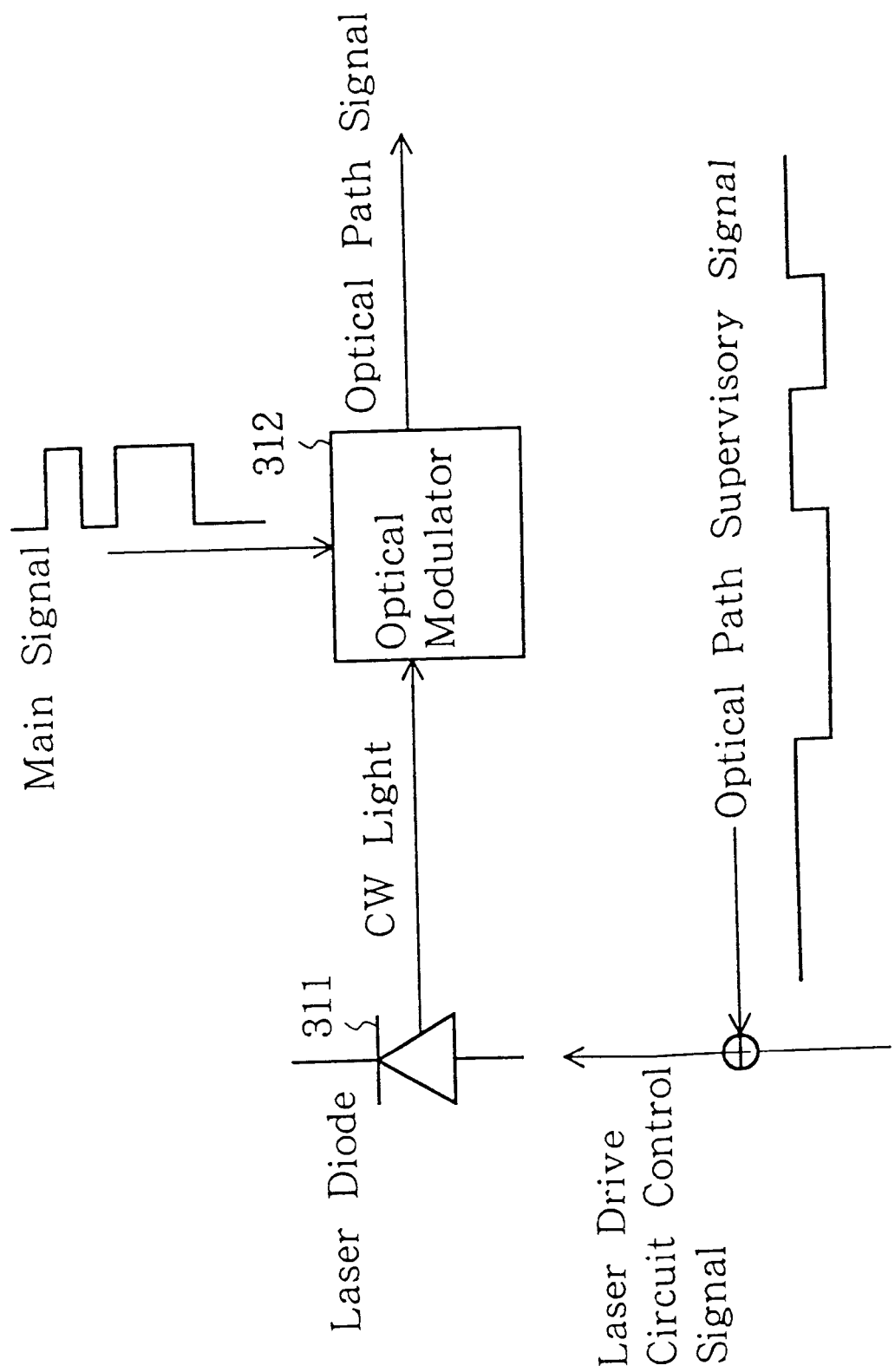
FIG. 10 shows an example of a configuration for superimposing an optical path supervisory signal at the optical level on an optical path signal.
Figure 11:
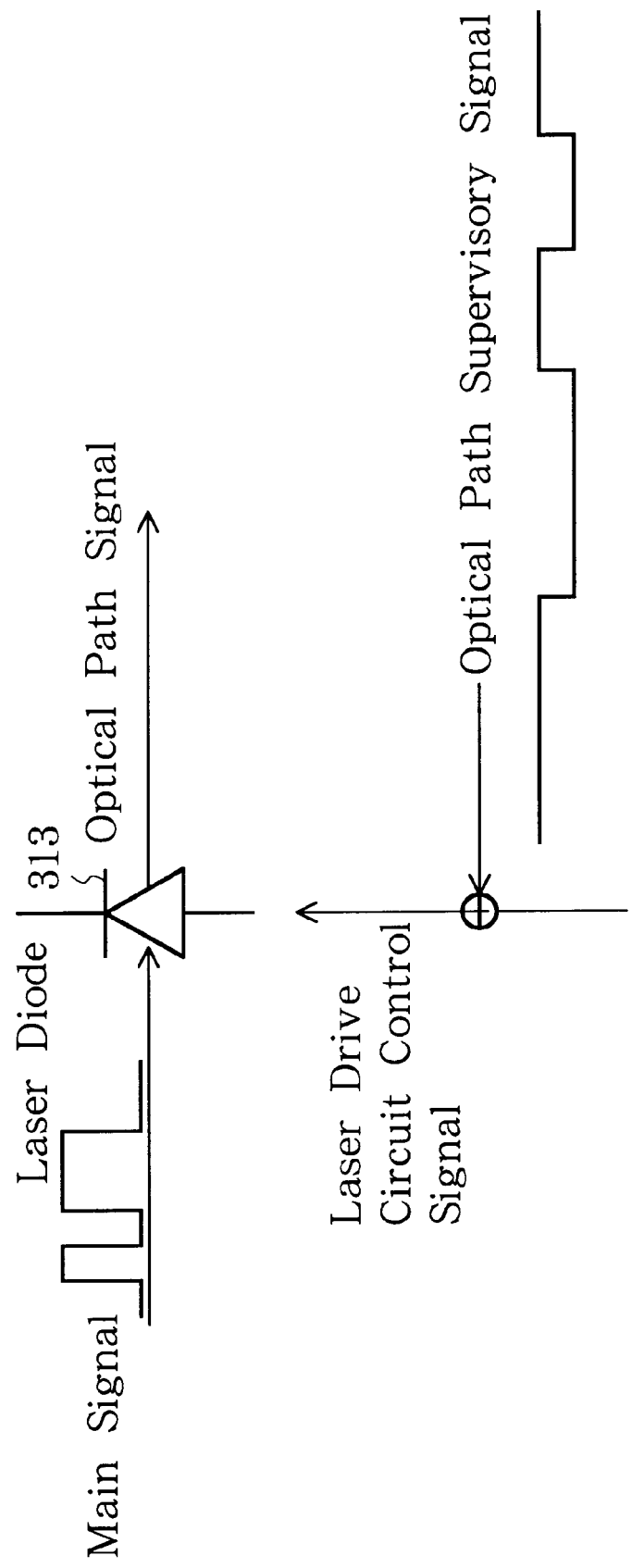
FIG. 11 shows an example of another configuration for superimposing an optical path supervisory signal at the optical level on an optical path signal.

With respect to the insertion by optical path supervisory signal insertion circuit 213 of the optical path supervisory signal at the optical level, an optical signal of a different wavelength from the wavelength of the main signal may be used, or a different modulation from that of the main signal may be applied to the optical path signal. Examples of these possibilities are shown in FIG. 10 and FIG. 11. In the configuration shown in FIG. 10, a continuous wave output is produced by laser diode 311, and optical modulator 312 uses the main signal to modulate this continuous wave. In this case, the optical path supervisory signal at the optical level can be added by being superimposed on the drive signal which is input to laser diode 311. In the configuration shown in FIG. 11, laser diode 313 is modulated directly by the main signal. In this case as well, the optical path supervisory signal at the optical level can be added by being superimposed on the drive signal which is input to laser diode 313.

Figure 12:
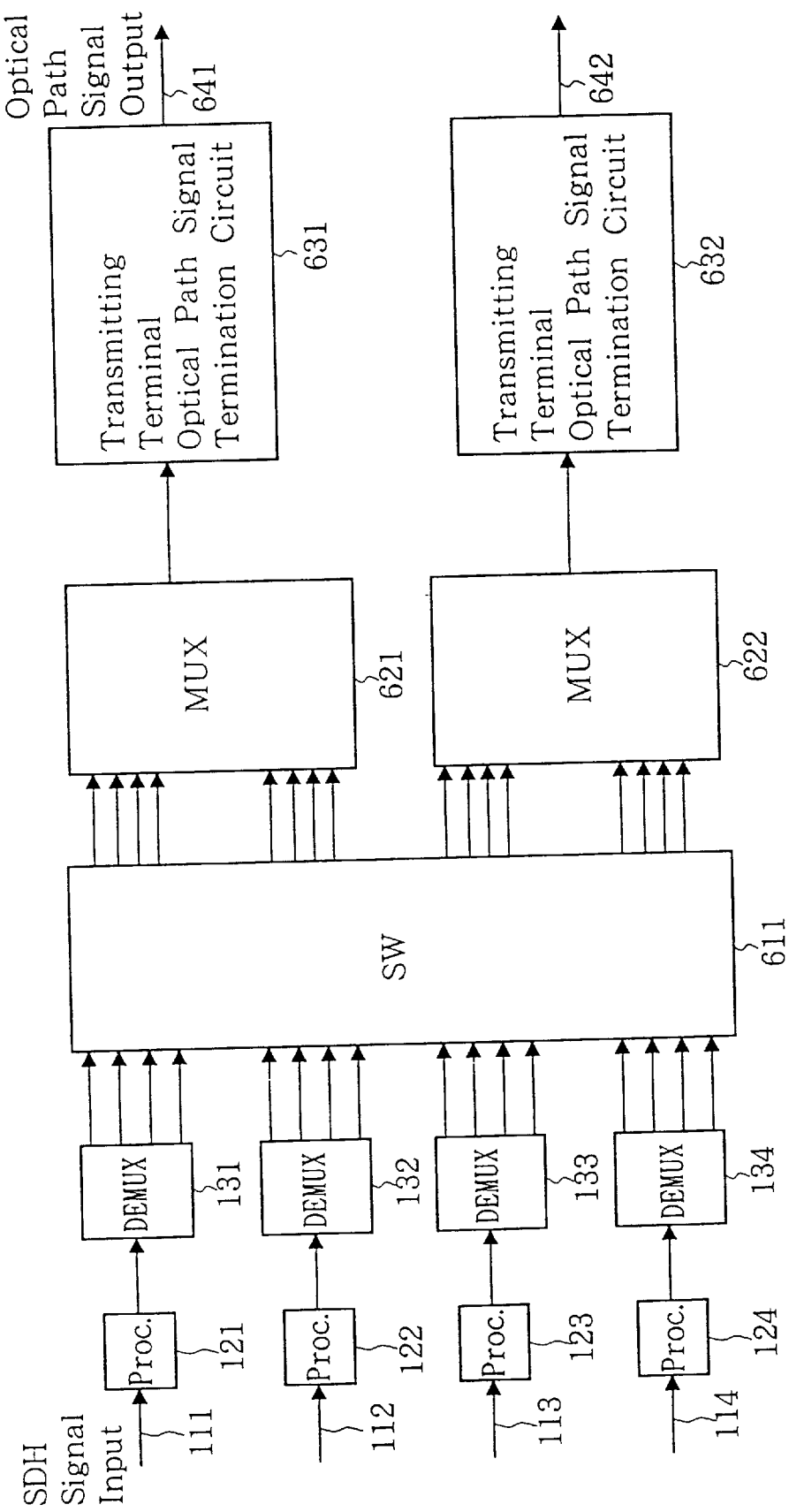
FIG. 12 is a block diagram of optical path signal termination equipment according to a second embodiment of this invention.

FIG. 12 is a block diagram showing optical path signal termination equipment according to a second embodiment of this invention. One of the important features of this second embodiment is that, by adding switching circuit 611 to the first embodiment, the SDH signals can be re-routed.

The operation of SDH signal input lines 111–114, SDH section supervisory signal processing circuits 121–124, and demultiplexing circuits 131–134 is the same as in the first embodiment of this invention.

The payload signals (i.e., VC signals) that have been output from demultiplexing circuits 131–134 can have their spatial positions shifted by switching circuit 611. Because this second embodiment uses a 16×16 switch, it can distribute the sixteen VC signals in any manner desired between multiplexing circuit 621 and multiplexing circuit 622.

The payload signals that have been distributed by switching circuit 611 are multiplexed by multiplexing circuits 621 and 622. These multiplexing circuits 621 and 622 each add AU pointers to the eight payload signals which have been input. Multiplexing circuits 621 and 622 also perform byte-interleaved multiplexing of the resulting eight AU signals.

The outputs of multiplexing circuits 621 and 622 are respectively sent to transmitting terminal optical path signal termination circuits 631 and 632. Transmitting terminal optical path signal termination circuits 631 and 632 each comprise optical path supervisory signal insertion circuit 211, electrical to optical conversion circuit 212, optical path supervisory signal insertion circuit 213 and optical path supervisory signal controller 214 shown in the first embodiment. The circuits 631 and 632 perform the following processing on the outputs of multiplexing circuits 621 and 622 respectively: insertion of optical path supervisory signals at the electrical level, electrical to optical conversion, and addition of optical path supervisory signals at the optical level. The results of this processing are then output to optical path signal output lines 641 and 642 as optical path signals.

Thus, by demultiplexing the input SDH signals into VC signals and providing a switching circuit capable of switching these VC signals, it is possible to configure optical path signal termination equipment which offers a switching function at the VC signal level. As a result, in the event of a fault occurring in optical path signal output line 641 or 642, the transmission path for the optical path signal can be rapidly switched over.

Figure 13:
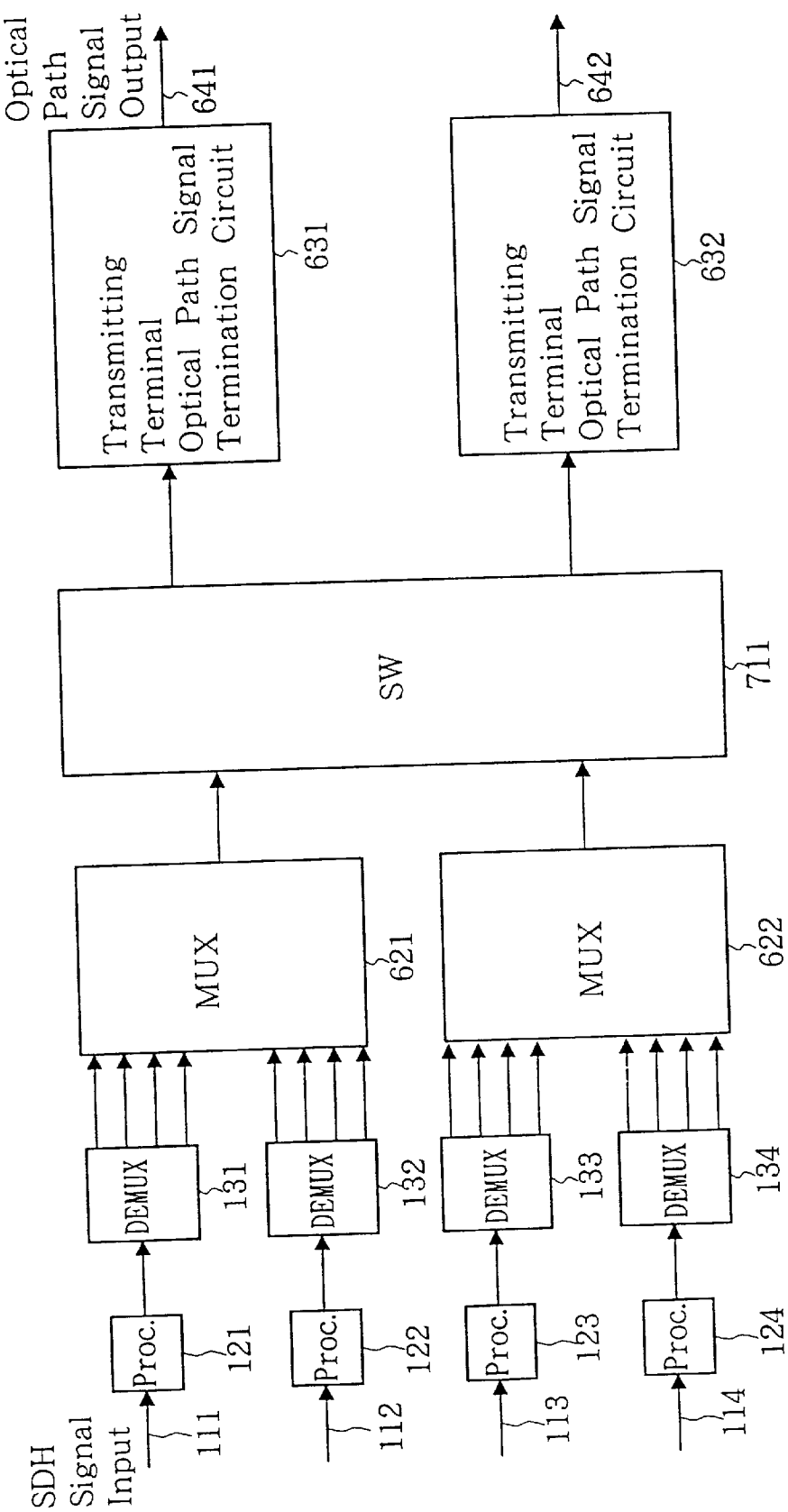
FIG. 13 is a block diagram of optical path signal termination equipment according to a third embodiment of this invention.

FIG. 13 is a block diagram showing optical path signal termination equipment according to a third embodiment of this invention. One of the important features of this embodiment is that, by employing switching circuit 711 to perform switching after the VC signals have been multiplexed, the optical path termination equipment can be configured using a smaller switch.

The operation of SDH signal input lines 111–114, SDH section supervisory signal processing circuits 121–124, and demultiplexing circuits 131–134 is the same as in the first embodiment.

The payload signals (i.e., VC signals) which have been output from demultiplexing circuits 131–134 are multiplexed by multiplexing circuits 621 and 622. Namely, multiplexing circuits 621 and 622 each add AU pointers to the eight payload signals which have been input, and then perform byte-interleaved multiplexing of the resulting eight AU signals.

The signals which have been multiplexed by multiplexing circuits 621 and 622 can have their spatial positions switched by switching circuit 711. Switching circuit 711 differs from switching circuit 611 in that it does not switch VC signals, but instead switches the output signals from multiplexing circuits 621 and 622.

The outputs of switching circuit 711 are sent to transmitting terminal optical path signal termination circuits 631 and 632. The transmitting terminal optical path signal termination circuits 631 and 632 each comprise first optical path supervisory signal insertion circuit 211, electrical to optical conversion circuit 212, second optical path supervisory signal insertion circuit 213 and optical path supervisory signal controller 214 shown in the first embodiment. The circuits 631 and 632 respectively perform the following processing on the outputs of switching circuit 711: insertion of optical path supervisory signals at the electrical level, electrical to optical conversion, and addition of optical path supervisory signals at the optical level. The results of this processing are then output to optical path signal output lines 641 and 642 as optical path signals.

Because this third embodiment uses a 2×2 switch as switching circuit 711, it can distribute the SDH signal group input from SDH signal input lines 111 and 112, and the SDH signal group input from SDH signal input lines 113 and 114, in any manner desired between the two optical path signal output lines 641 and 642. A larger switch can be used for switching circuit 711 in correspondence with any increase in the number of SDH signal input lines and/or optical path signal output lines. Even when a larger switch 711 has to be used, it is still possible to employ a switch with fewer inputs and outputs than switching circuit 611 used in the second embodiment.

Figure 14:
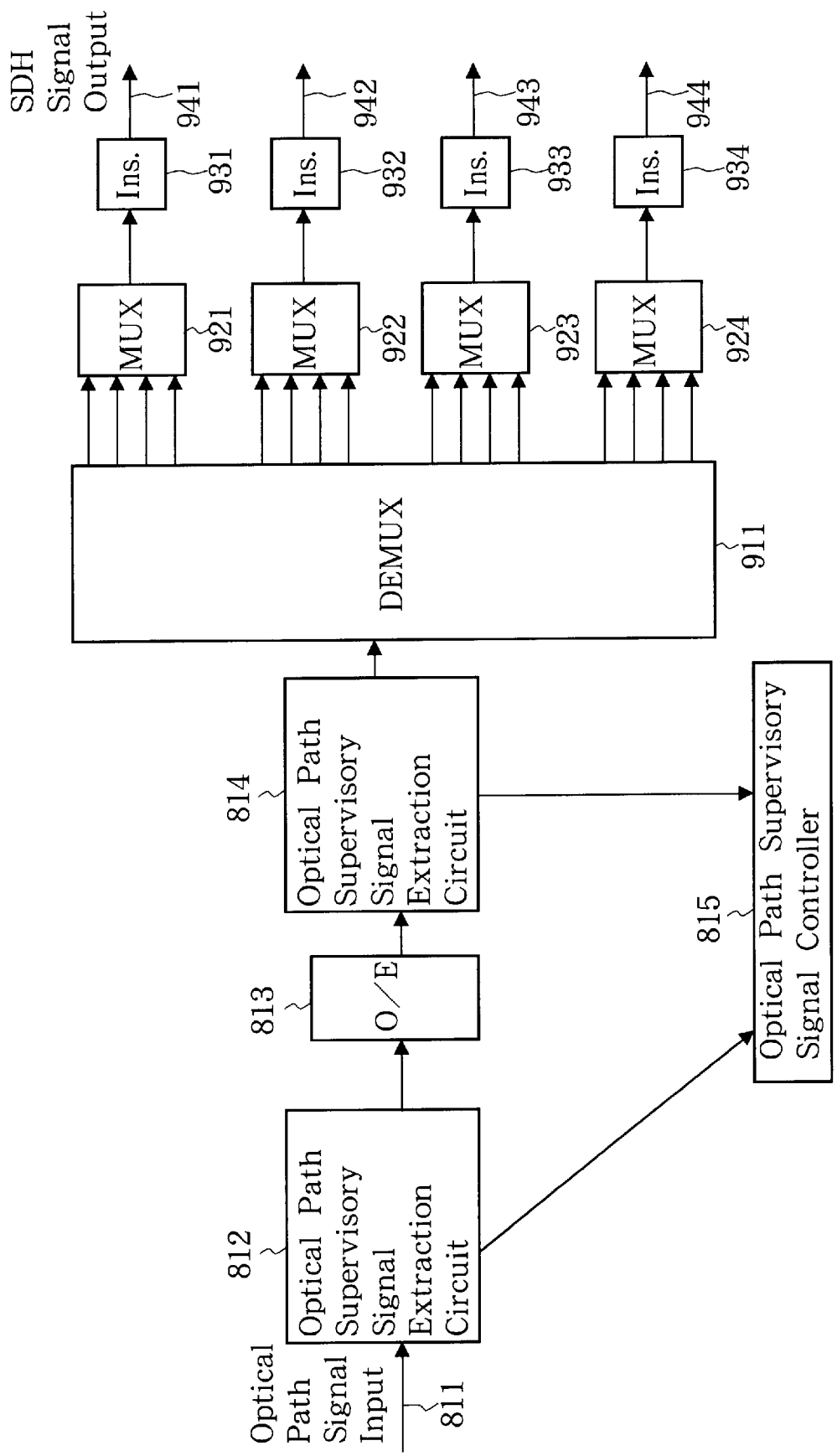
FIG. 14 is a block diagram of optical path signal termination equipment according to a fourth embodiment of this invention.

FIG. 14 is a block diagram showing optical path signal termination equipment according to a fourth embodiment of this invention, and in particular, showing the configuration of optical path signal termination equipment for a receiving terminal which converts an optical path signal to SDH signals.

This optical path signal termination equipment comprises: optical path supervisory signal extraction circuit 812 for separating the optical path supervisory signal at the optical level from the optical path signal, optical to electrical conversion circuit 813 for converting this optical path signal to an electrical signal, optical path supervisory signal extraction circuit 814 for extracting the optical path supervisory signal at the electrical level from the optical path signal that has been converted to an electrical signal, optical path supervisory signal controller 815 for processing the optical path supervisory signals at the optical level and the electrical level, demultiplexing circuit 911 for demultiplexing the electrical signal output by optical path supervisory signal extraction circuit 814 and converting it to a plurality of VC signals, multiplexing circuits 921–924 for multiplexing the plurality of VC signals output by the demultiplexing circuit 911 and converting them to AU signals by adding AU pointers, and SDH section supervisory signal insertion circuits 931–934 for inserting SDH section supervisory signals in the AU signals output by the multiplexing circuits 921–924 and outputting the resulting signals to SDH signal output lines 941–944.

Optical path supervisory signal extraction circuit 812 demodulates the optical path supervisory signal which has been superimposed at the optical level on the optical path signal input from optical path signal input line 811. If the optical path supervisory signal has been wavelength multiplexed onto the optical path signal, the demodulation is performed after wavelength demultiplexing. If the optical path supervisory signal has been superimposed by applying a different modulation from that of the optical path signal, the demodulation is performed after splitting the optical signal. This enables the optical path supervisory signal to be demodulated without destroying the payload area which constitutes the main signal. The demodulated optical path supervisory signal is then sent to optical path supervisory signal controller 815.

Optical to electrical conversion circuit 813 converts to an electrical signal the optical path signal after it has been processed by optical path supervisory signal extraction circuit 812.

Optical path supervisory signal extraction circuit 814 extracts the optical path supervisory signal in optical path supervisory signal areas O1 and O2 shown in FIG. 9 from the electrical signal output by optical to electrical conversion circuit 813, and sends it to optical path supervisory signal controller 815. After this extraction, optical path supervisory signal areas O1 and O2 are undefined and may be used to contain any kind of data.

Demultiplexing circuit 911 demultiplexes the payload areas of the signal output from optical path supervisory signal extraction circuit 814 and outputs the result as individual VC signals. In this example, it is assumed that demultiplexing circuit 911 converts its input signal into sixteen VC signals.

Multiplexing circuits 921–924 each multiplex a plurality of VC signals (in this case, four) from demultiplexing circuit 911, firstly converting these VC signals to AU signals by adding AU pointers and then performing byte-interleaved multiplexing and outputting the result.

SDH section supervisory signal insertion circuits 931–934 respectively add an SDH section supervisory signal to the output of multiplexing circuits 921–924, and output the result as an SDH signal to SDH signal output lines 941–944. In this embodiment, SDH signals are output in the STM-N signal format shown in FIG. 5, with N=4.

Figure 15:
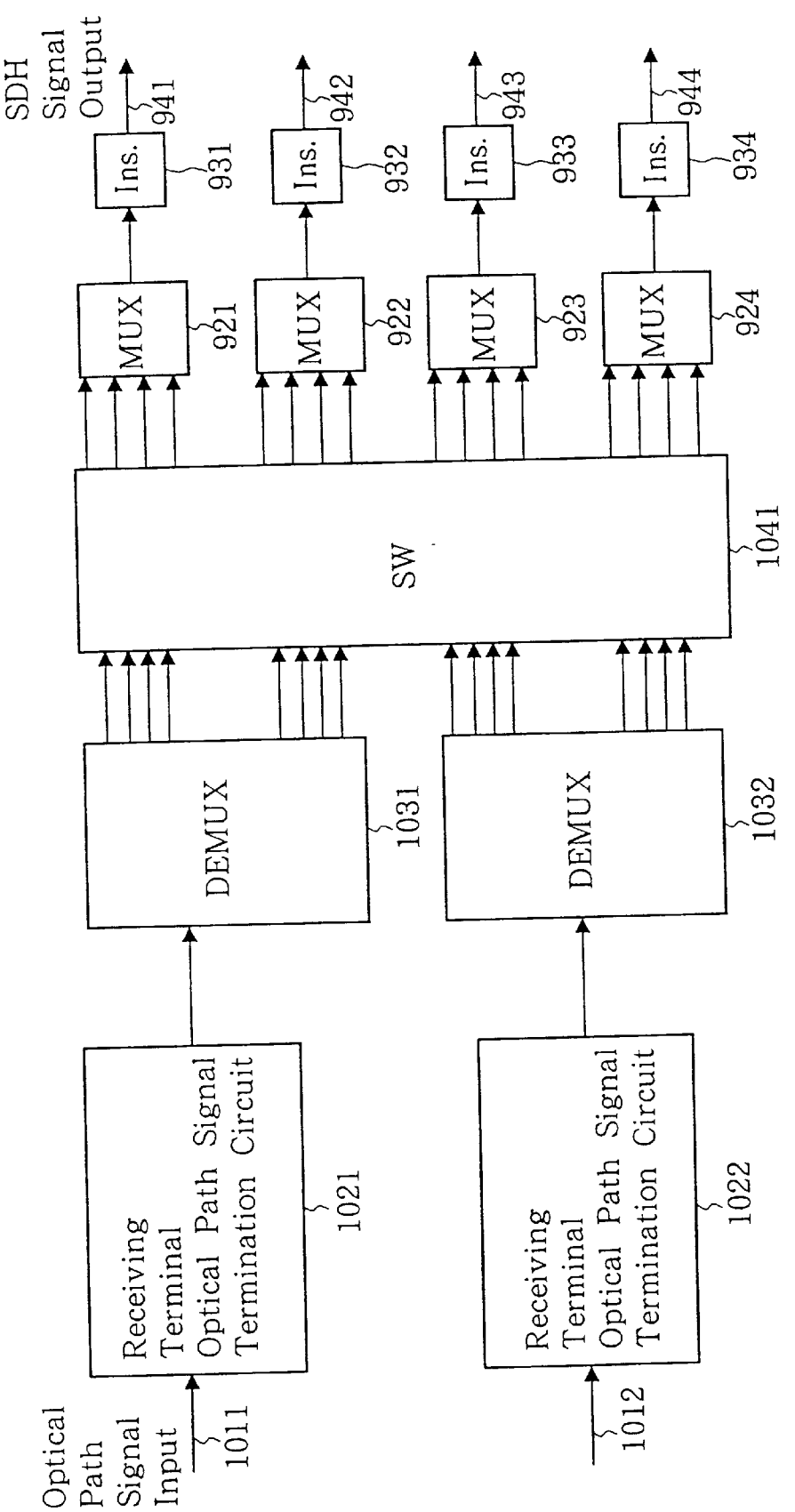
FIG. 15 is a block diagram of optical path signal termination equipment according to a fifth embodiment of this invention.

FIG. 15 is a block diagram showing optical path signal termination equipment according to a fifth embodiment of this invention. This embodiment comprises: two optical path signal input lines 1011 and 1012; two receiving terminal optical path signal termination circuits 1021 and 1022, each comprising optical path supervisory signal extraction circuit 812, optical to electrical conversion circuit 813, optical path supervisory signal extraction circuit 814 and optical path supervisory signal controller 815; and two demultiplexing circuits 1031 and 1032 each similar to demultiplexing circuit 911. This fifth embodiment differs from the fourth embodiment in that it also has switching circuit 1041 which enables the VC signals converted from the optical path signal to be switched.

The operation of receiving terminal optical path signal termination circuits 1021 and 1022 and of demultiplexing circuits 1031 and 1032 is the same as in the fourth embodiment. The VC signals output from demultiplexing circuits 1031 and 1032 can have their spatial positions shifted by switching circuit 1041. Because this fifth embodiment uses a 16×16 switch, it can distribute the sixteen VC signals in any manner desired among multiplexing circuits 921–924.

The VC signals that have been distributed by switching circuit 1041 are multiplexed by multiplexing circuits 921–924 in the same manner as in the fourth embodiment, and after having SDH section supervisory signals added by SDH section supervisory signal insertion circuits 931–934, are output from SDH signal output lines 941–944.

Thus, as has been explained above, by demultiplexing the optical path signal into VC signals and providing a switching circuit capable of switching these VC signals, it is possible to configure optical path signal termination equipment which offers a switching function at the VC signal level.

Figure 16:
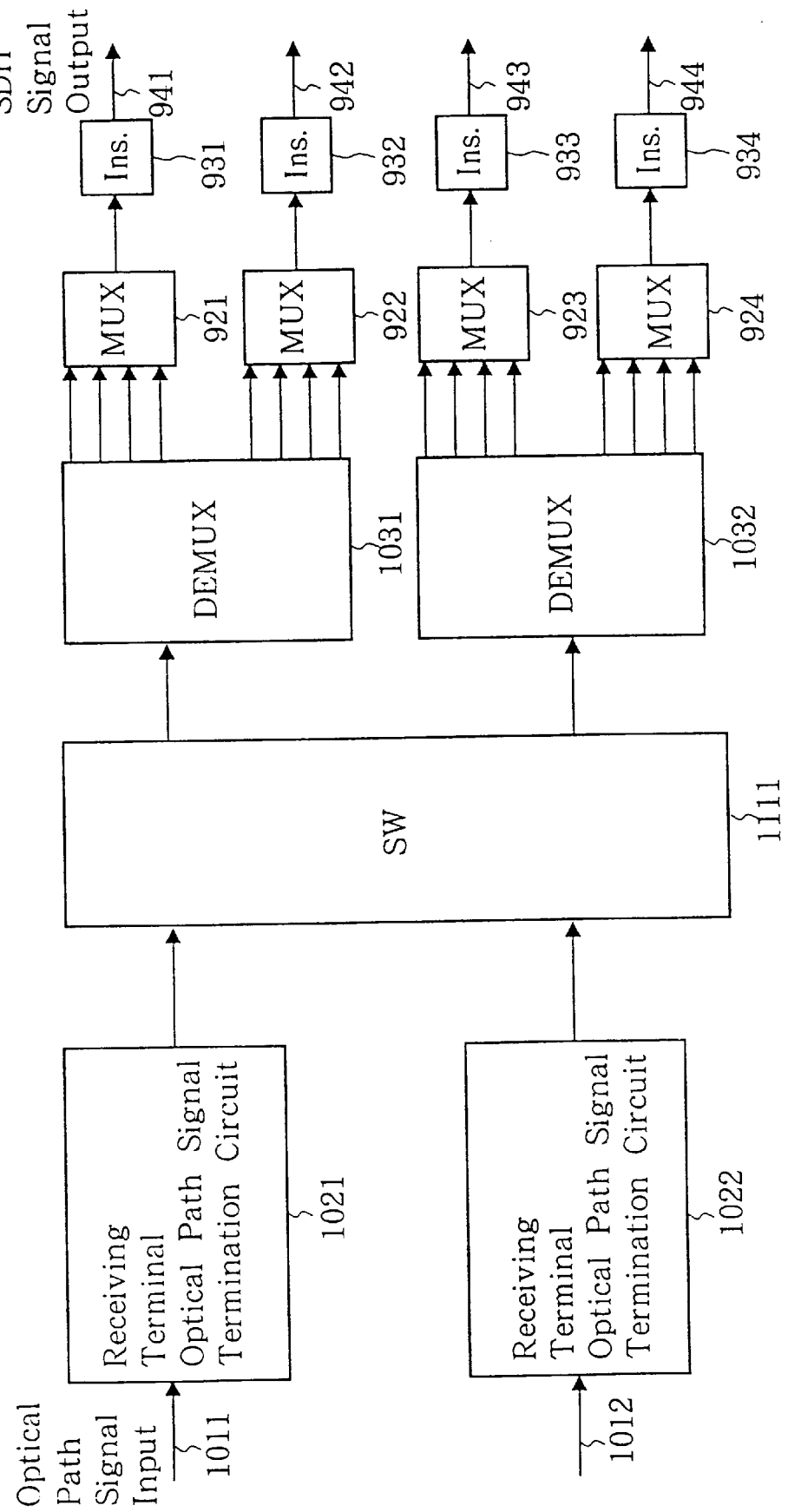
FIG. 16 is a block diagram of optical path signal termination equipment according to a sixth embodiment of this invention.

FIG. 16 is a block diagram showing optical path signal termination equipment according to a sixth embodiment of this invention. By performing switching in switching circuit 1111 prior to demultiplexing into VC signals, this embodiment can configure the optical path termination equipment using a smaller switch.

The operation of optical path signal input lines 1011 and 1012, and of receiving terminal optical path signal termination circuits 1021 and 1022, is the same as in the fifth embodiment.

The signals output from receiving terminal optical path signal termination circuits 1021 and 1022 can have their spatial positions shifted by switching circuit 1111. Because this sixth embodiment uses a 2×2 switch as switching circuit 1111, it can distribute the optical path signal input from optical path signal input line 1011 and the optical path signal input from optical path signal input line 1012 in any manner desired between the two SDH signal output line groups (i.e., SDH signal output lines 941 and 942, and SDH signal output lines 943 and 944).

The signals sent to demultiplexing circuits 1031 and 1032 from switching circuit 1111 are converted to VC signals. These VC signals are multiplexed by multiplexing circuits 921–924, and after having SDH section supervisory signals added by SDH section supervisory signal insertion circuits 931–934, are output from SDH signal output lines 941–944.

Figure 17:
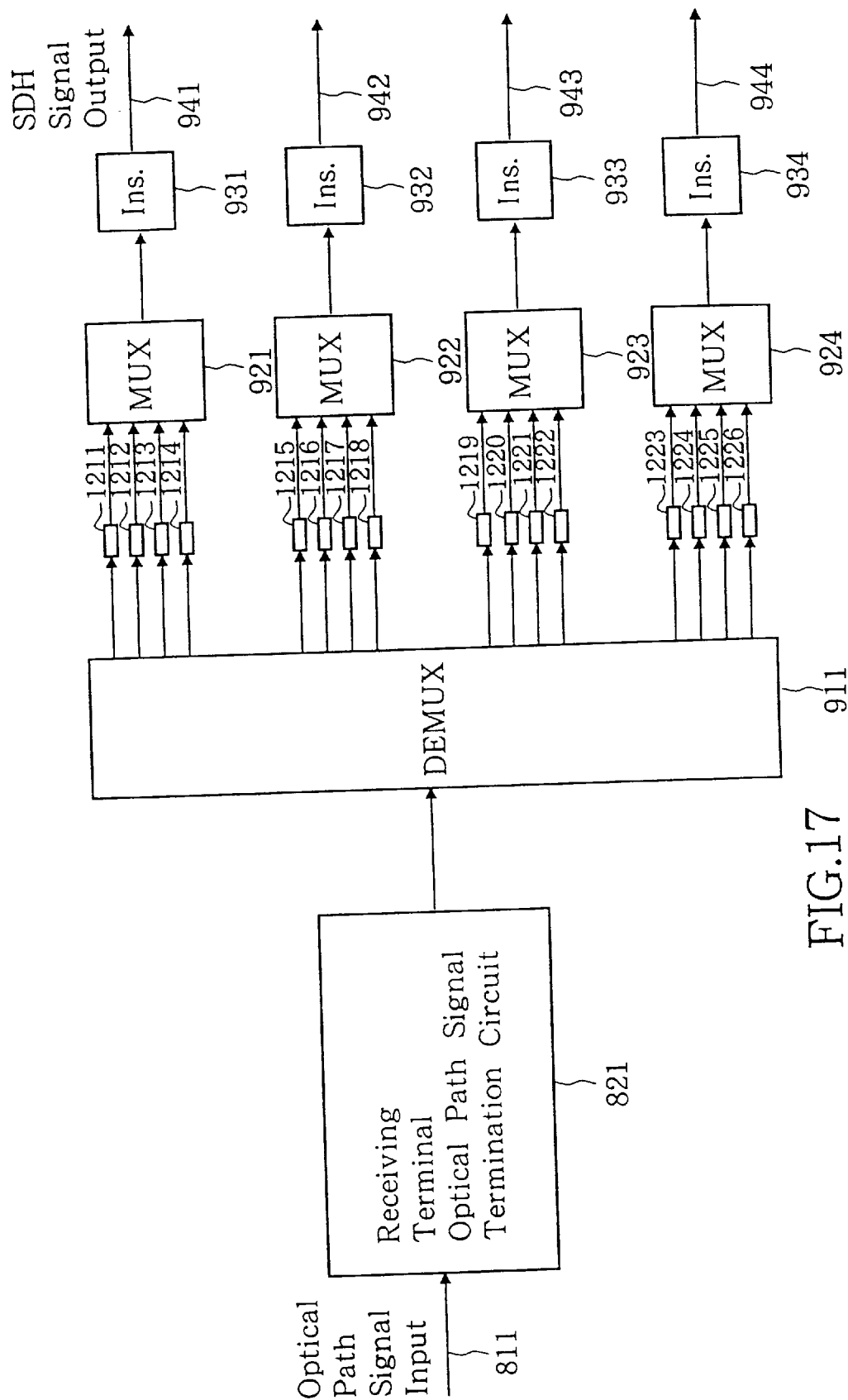
FIG. 17 is a block diagram of optical path signal termination equipment according to a seventh embodiment of this invention.

FIG. 17 is a block diagram showing optical path signal termination equipment according to a seventh embodiment of this invention. This embodiment facilitates flexible network operation by adding SDH path supervisory signal rewriting circuits 1211–1226 to the fourth embodiment.

The operation of optical path signal input line 811; receiving terminal optical path signal termination circuit 821 comprising optical path supervisory signal extraction circuit 812, optical to electrical conversion circuit 813, optical path supervisory signal extraction circuit 814 and optical path supervisory signal controller 815; and demultiplexing circuit 911, is the same as in the fourth embodiment.

Figure 1:
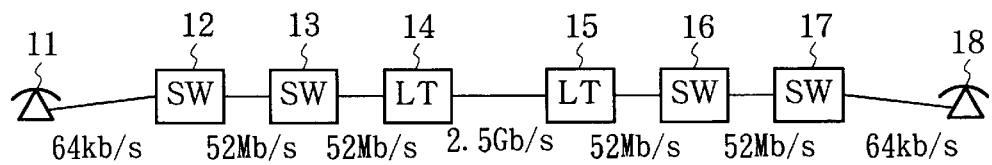
FIG. 1 serves as a simple explanation of a conventional switched network connecting subscriber terminals.
Figure 2:
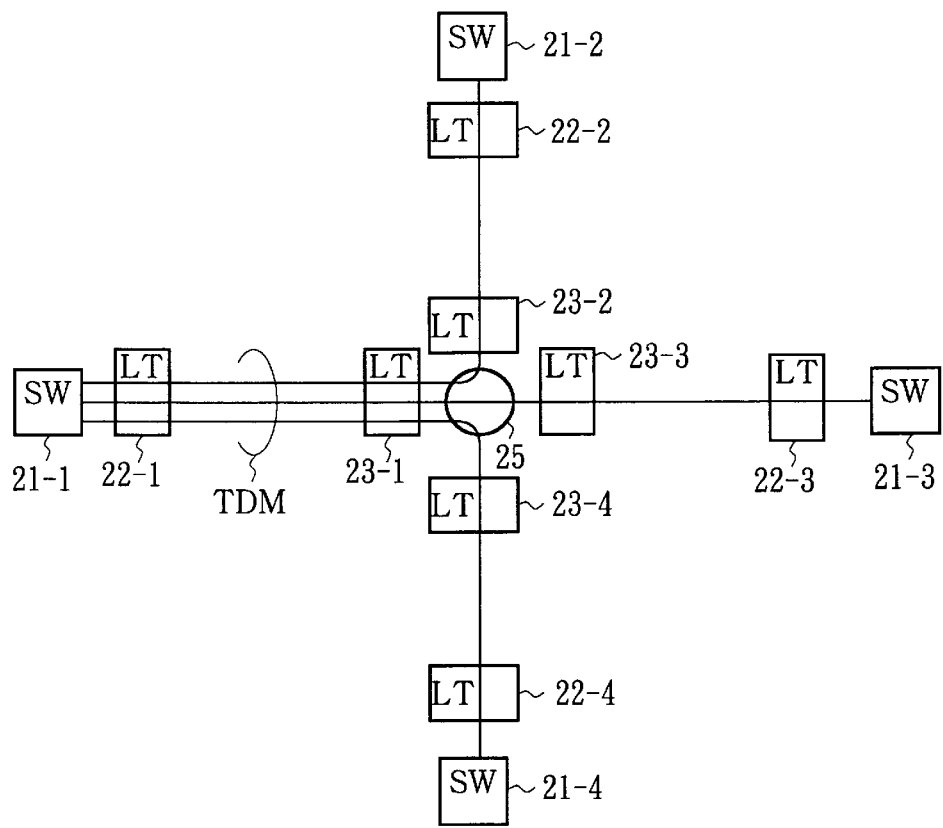
FIG. 2 serves to explain path connection of SDH signals via an SDH cross-connect.
Figure 3:
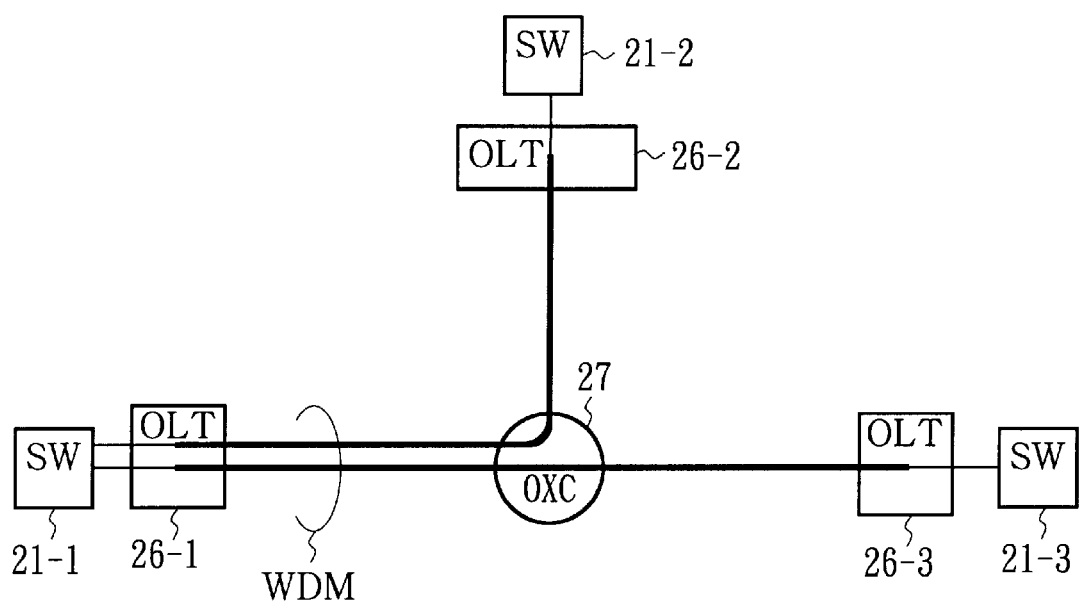
FIG. 3 serves to explain how some of the path connections shown in FIG. 2 would be implemented in an optical path network.
Figure 4:
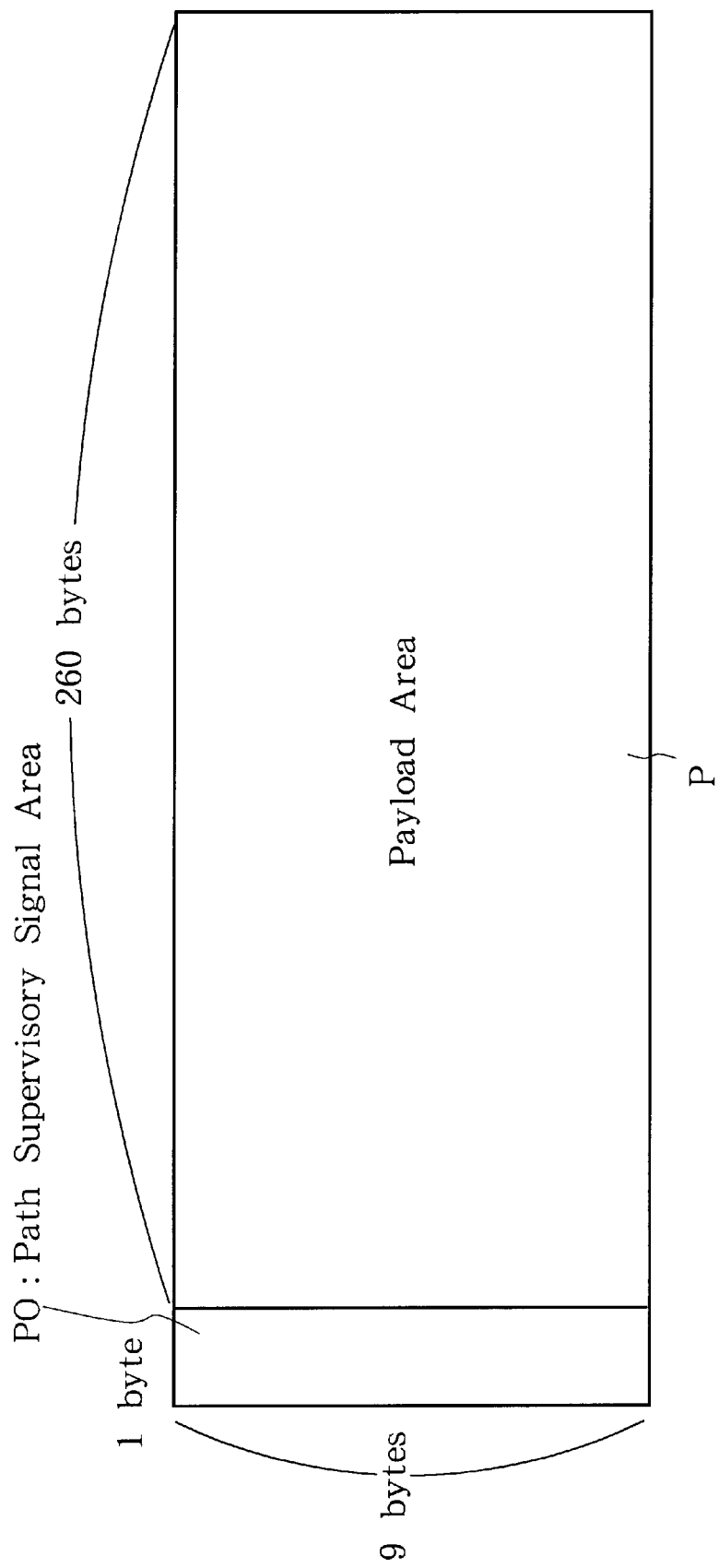
FIG. 4 shows the format of a VC signal.

The sixteen VC signals output from demultiplexing circuit 911 are input to respective SDH path supervisory signal rewriting circuits 1211–1226. In the present invention, the VC signals can, in principle, be any of VC-3, VC-4, VC4-4c and VC4-16c, but the following explanation is for VC-4 signals. As shown in FIG. 4, a VC-4 signal comprises path supervisory signal area PO (9 bytes) and payload area P (9×260 bytes). SDH path supervisory signal rewriting circuits 1211–1226 are circuits for setting a desired value, given from outside, for the path supervisory signal area PO.

VC signals which have had their path supervisory signal area PO rewritten by SDH path supervisory signal rewriting circuits 1211–1226 are input to multiplexing circuits 921–924, where they are multiplexed. SDH section supervisory signal insertion circuits 931–934 are respectively connected to the outputs of multiplexing circuits 921–924, and complete the formation of SDH signals by adding SDH section supervisory signals, which are then output to SDH signal output lines 941–944.

Although this seventh embodiment has been configured by adding SDH path supervisory signal rewriting circuits 1211–1226 to the fourth embodiment, the same effect can also be obtained using the configurations of the fifth and sixth embodiments, in which a switching circuit was employed, by connecting SDH path supervisory signal rewriting circuits 1211–1226 to the outputs of demultiplexing circuits 1031 and 1032.

SDH path supervisory signals are rewritten, for example, when a fault has occurred in the optical path signal which is input from optical path signal input line 811. It is stipulated that if a fault occurs in the optical path signal, demultiplexing circuit 911 outputs, as the VC signals, signals in which every bit is a logical "1" (see ITU-T Recommendation G.783, "Characteristics of synchronous digital hierarchy (SDH) equipment functional blocks"). In this event, because the path supervisory signal areas of the VC signals do not have a legitimate value, there is a possibility that the fault will be recognized by the SDH network and that the path restoration function of the SDH network will operate. Because the optical path network also has a path restoration function, it is desirable from the point of view of network operation that when a fault occurs in the optical path network, paths can be restored without performing path restoration in the SDH network. Therefore, the SDH path supervisory signals can be set by the SDH path supervisory signal rewriting circuits in such manner that path restoration is not performed in the SDH network.

Figure 18:
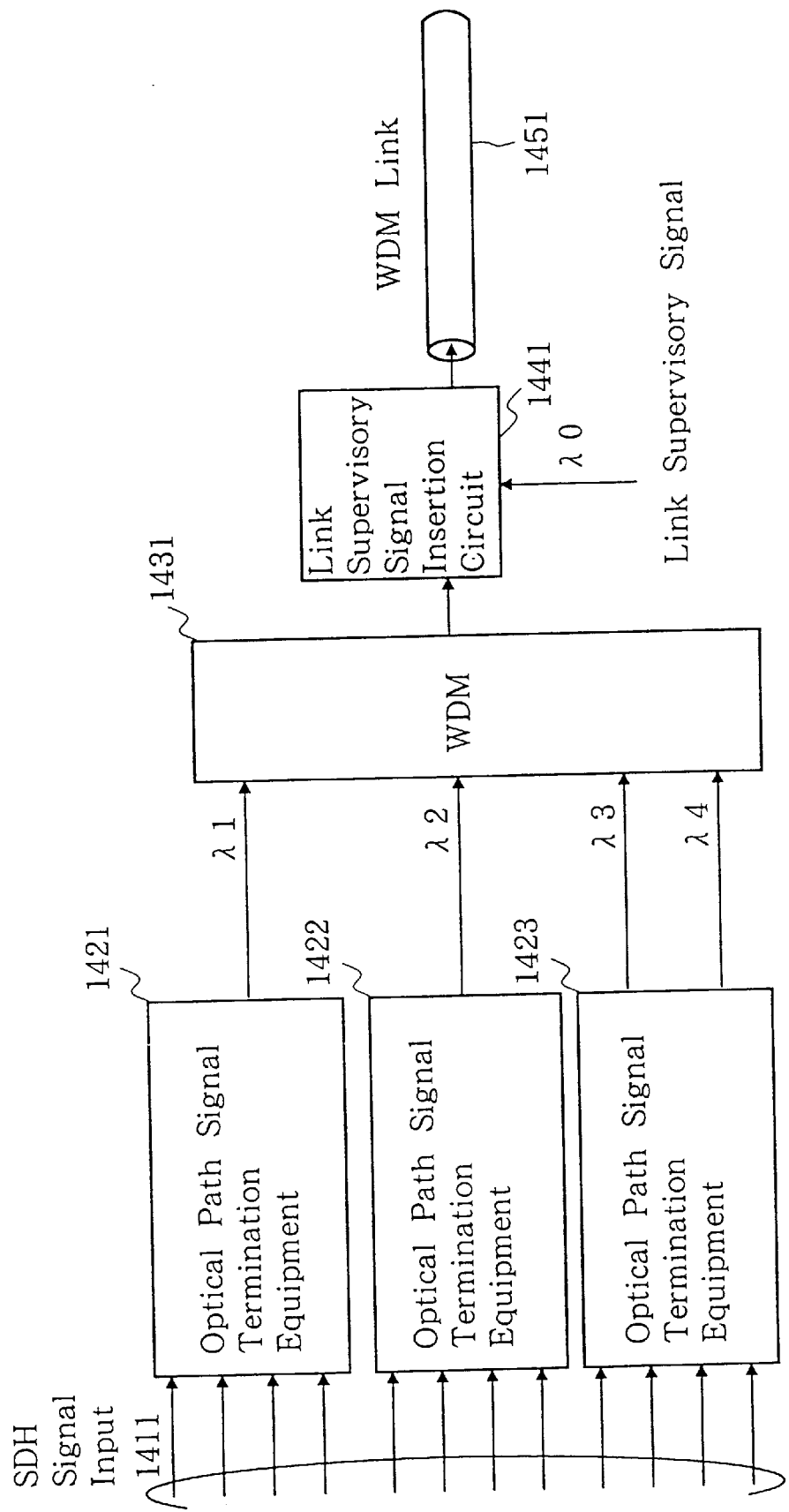
FIG. 18 is a block diagram of an optical path terminator according to an eighth embodiment of this invention.

FIG. 18 is a block diagram showing an eighth embodiment of this invention, and illustrates an example in which the invention has been implemented in an optical path terminator to which SDH signals are input and from which a wavelength multiplexed optical path signal is output to a wavelength multiplex link.

This optical path terminator comprises a plurality of (in this example, three) optical path signal termination equipment 1421–1423 for terminating the SDH signals, converting them to optical path signals, and outputting the optical path signals. Optical carriers of different wavelength are allocated to optical path signal termination equipment 1421–1423. The optical path terminator of this eighth embodiment also comprises wavelength multiplexing circuit 1431 which wavelength division multiplexes the optical signals output from optical path signal termination equipment 1421–1423 and sends the result to wavelength multiplex link 1451; and link supervisory signal insertion circuit 1441 which inserts a link supervisory signal in the wavelength multiplexed optical signal sent to wavelength multiplex link 1451 from wavelength multiplexing circuit 1431.

In the example of this embodiment, single optical carriers $\lambda 1$ and $\lambda 2$ are respectively allocated to optical path signal termination equipment 1421 and 1422, while two optical carriers $\lambda 3$ and $\lambda 4$ are allocated to optical path signal termination equipment 1423. In this case, the configuration shown in the first embodiment can be used for optical path signal termination equipment 1421 and 1422, while the configuration shown in the second or third embodiments can be used for optical path signal termination equipment 1423. Although this eighth embodiment shows a configuration in which a plurality of types of optical path signal termination equipment are used together, it is also feasible to have a configuration in which only one of the various types of optical path signal termination equipment shown in the embodiments is employed.

The SDH signals which have been input from SDH signal input lines 1411 are accommodated in optical path signals by means of optical path signal termination equipment 1421–1423. Different wavelengths are allocated to the optical carriers of the optical path signals, which are then multiplexed by wavelength multiplexing circuit 1431. The resulting wavelength multiplexed optical path signal is then input to link supervisory signal insertion circuit 1441 and a link supervisory signal is inserted. This link supervisory signal is an optical signal which uses an optical carrier of different wavelength from the wavelengths of the wavelength multiplexed optical path signal group, and is used to transmit information relating to the wavelength multiplexed optical path signal group to adjacent optical path termination equipment and so forth. In this eighth embodiment, $\lambda 0$ is used as the optical carrier wavelength for the link supervisory signal.

Link supervisory signal insertion circuit 1441 provides the capability of wavelength multiplexing the link supervisory signal with the already wavelength multiplexed optical path signal group. Another possible configuration is to have wavelength multiplexing circuit 1431 serve also as the link supervisory signal insertion circuit. In either case, the optical path signal group and the link supervisory signal are input to wavelength multiplex link 1451.

Figure 19:
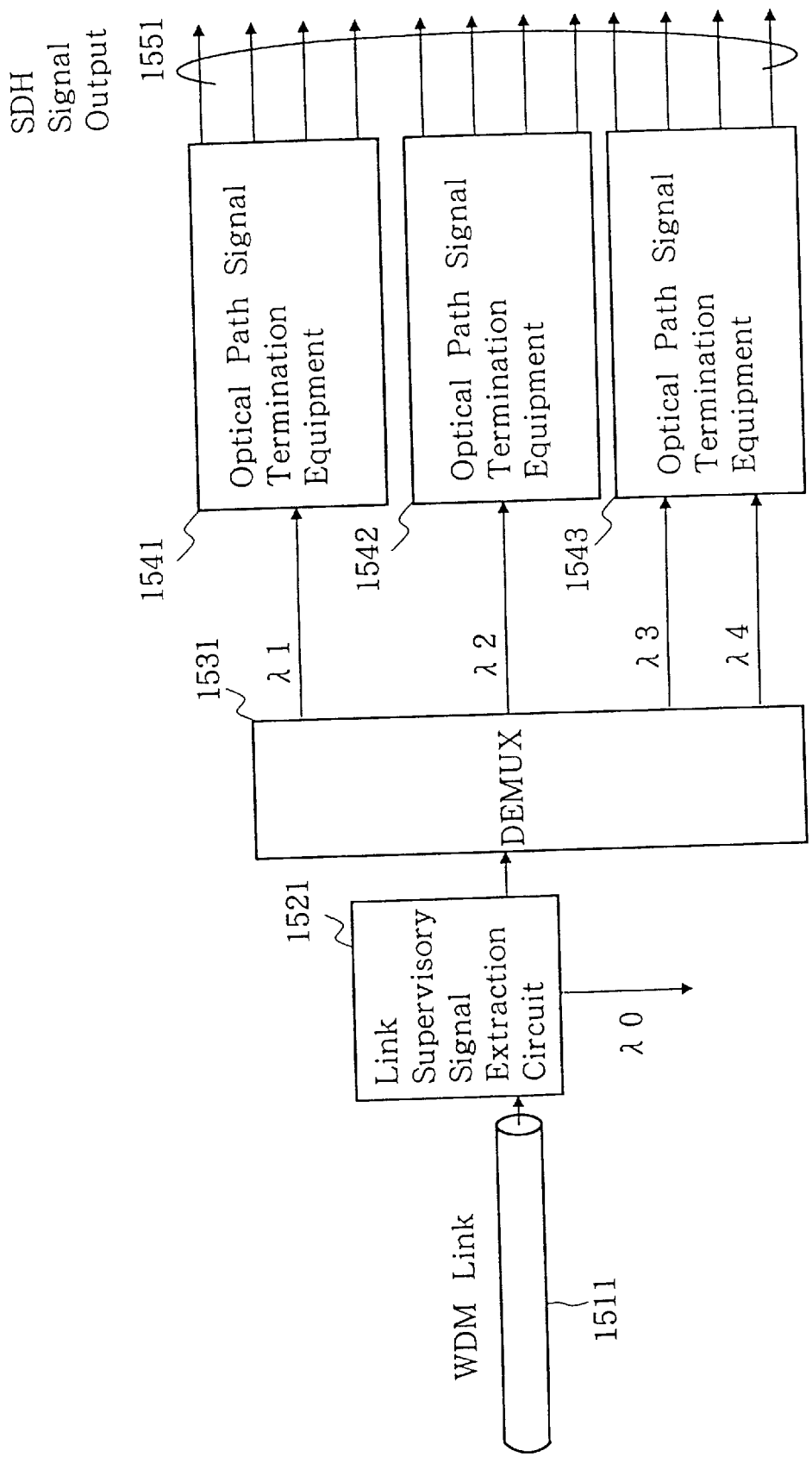
FIG. 19 is a block diagram of an optical path terminator according to a ninth embodiment of this invention.

FIG. 19 is a block diagram showing a ninth embodiment of this invention, and illustrates an example in which the invention has been implemented in an optical path terminator which extracts SDH signals accommodated in a wavelength multiplexed optical path signal input from a wavelength multiplex link, and outputs the result to SDH signal output lines.

This optical path terminator comprises a plurality of (in this example, three) optical path termination equipment 1541–1543 for terminating the optical path signals, converting them to SDH signals, and outputting the SDH signals. An optical carrier of different wavelength is allocated to each optical path termination equipment 1541–1543. The optical path terminator of this ninth embodiment also comprises link supervisory signal extraction circuit 1521 which extracts the link supervisory signal from the wavelength multiplexed optical signal which has been input from wavelength multiplex link 1511; and wavelength demultiplexing circuit 1531 which demultiplexes the wavelength multiplexed optical signal from wavelength multiplex link 1511 and outputs the results to optical path termination equipment 1541–1543.

In the example of this embodiment, single optical carriers $\lambda 1$ and $\lambda 2$ are respectively allocated to optical path signal termination equipment 1541 and 1542, while two optical carriers $\lambda 3$ and $\lambda 4$ are allocated to optical path signal termination equipment 1543. In this case, the configuration shown in the fourth or seventh embodiments can be used for optical path signal termination equipment 1541 and 1542, while the configuration shown in the fifth or sixth embodiments can be used for optical path signal termination equipment 1543. Although this ninth embodiment shows a configuration in which a plurality of types of optical path signal termination equipment are used together, it is also feasible to have a configuration in which only one of the various types of optical path signal termination equipment shown in the embodiments is employed.

The wavelength multiplexed optical path signal group and link supervisory signal are input from wavelength multiplex link 1511 to link supervisory signal extraction circuit 1521. Link supervisory signal extraction circuit 1521 demultiplexes only the wavelength of the link supervisory signal. In this ninth embodiment, a wavelength $\lambda 0$ is assigned for the link supervisory signal.

The optical path signal group which has been input to wavelength demultiplexing circuit 1531 is demultiplexed by wavelength. This embodiment shows an example in which four wavelengths $\lambda 1$, $\lambda 2$, $\lambda 3$ and $\lambda 4$ have been used as the multiplexing wavelengths.

Although this embodiment shows a configuration in which link supervisory signal extraction circuit 1521 and wavelength demultiplexing circuit 1531 are separate circuits, another possible configuration is to demultiplex the link supervisory signal and the optical path signal in a single wavelength demultiplexing circuit.

Each of the demultiplexed optical path signals is input to an optical path signal termination equipment 1541–1543 where it is converted to an SDH signal. The converted SDH signals are output from SDH signal output lines 1551.

Thus, because inter-conversion between SDH signals and optical path signals is achieved via VC signals, it is possible to add a switching circuit and SDH path supervisory signal rewriting circuits. As a result, in addition to the optical path signal termination function of inter-converting between optical path signals and SDH signals, it is possible to provide a switching function between SDH signals and optical path signals, and a path restoration function which is confined to the optical path network.

As has been explained in the foregoing, according to the present invention, an SDH signal can be converted to an optical path signal without changing the format of the SDH signal. Consequently, an optical path supervisory signal can be inserted without increasing the signal length. In addition, it is possible to switch an optical path signal between a plurality of output lines, and to deal separately with faults in the optical communication network and faults in the SDH network. It is therefore possible to realize optical path signal termination equipment capable of dealing with diverse service conditions.

We claim:

1. Optical path signal termination equipment comprising:
   electrical signal termination means for terminating at least one SDH signal which has been transmitted as an electrical signal, and for outputting an output electrical signal; and
   optical path termination means for inserting an optical path supervisory signal at an electrical level into the output electrical signal to produce a resulting signal, converting the resulting signal into an optical signal, and outputting the optical signal as an optical path signal;
   wherein the optical path termination means comprises means for inserting the optical path supervisory signal in place of a Synchronous Digital Hierarchy (SDH) section supervisory signal contained in the SDH signal.

2. Optical path signal termination equipment according to claim 1, wherein:
   the electrical signal termination means comprises:
   means for processing the SDH section supervisory signals contained in the SDH signals;

demultiplexing means for demultiplexing the SDH signals processed by the means for processing the SDH section supervisory signals, thereby converting the SDH signals to a plurality of Virtual Container (VC) signals; and multiplexing means for multiplexing the plurality of VC signals output by the demultiplexing means and converting them to Administrative Unit (AU) signals by adding AU pointers, then multiplexing the plurality of AU signals and outputting the output electrical signal with an optical path signal format; and the insertion means inserts the optical path supervisory signal at the electrical level in a predetermined area of the output electrical signal with the optical path signal format.

3. Optical path signal termination equipment according to claim 2, wherein the predetermined area is an area which corresponds to the area for the SDH section supervisory signal in the SDH signal format.

4. Optical path signal termination equipment according to claim 2, further comprising:

a plurality of optical path termination means;

a plurality of multiplexing means respectively provided in correspondence with the plurality of optical path termination means; and a switching circuit for switching signals between the plurality of multiplexing means and the demultiplexing means.

5. Optical path signal termination equipment according to claim 2, further comprising:

a plurality of multiplexing means;

a plurality of optical path termination means; and a switching circuit for switching signals provided between outputs of the plurality of multiplexing means and inputs of the plurality of optical path termination means.

6. Optical path signal termination equipment according to claim 1, wherein the optical path termination means comprises means for adding to the optical path signal an optical path supervisory signal at an optical level, the optical path supervisory signal at the optical level being separate from the optical path supervisory signal at the electrical level.

7. Optical path signal termination equipment according to claim 6, wherein the adding means wavelength division multiplexes the optical path signal and the optical path supervisory signal at the optical level.

8. Optical path signal termination equipment according to claim 6, wherein the adding means superimposes the optical path supervisory signal at the optical level on the optical path signal by application of a different modulation from the modulation of a main signal transmitted by the optical path signal.

9. Optical path signal termination equipment comprising:

optical path termination means receiving an optical path signal and converting the optical path signal to an electrical signal, said electrical signal including an optical path supervisory signal at an electrical level, and outputting the electrical signal; and electrical signal termination means for converting the electrical signal output by the optical path termination means to at least one Synchronous Digital Hierarchy (SDH) signal and outputting said at least one SDH signal;

wherein the optical path signal has a signal format which does not contain a SDH section supervisory signal of the at least one SDH signal; and electrical signal termination means comprises means for inserting an SDH section supervisory signal in place of an optical path supervisory signal contained in the optical path signal received by the optical path termination means.

10. Optical path signal termination equipment according to claim 9, wherein:

the optical path termination means comprises means for, after the optical path signal has been converted to the electrical signal, extracting the optical path supervisory signal at the electrical level which has been added to a predetermined area of the electrical signal; and the electrical signal termination means comprises:

demultiplexing means for demultiplexing the electrical signal output by the optical path termination means, thereby converting the electrical signal to a plurality of Virtual Container (VC) signals;

multiplexing means for multiplexing the plurality of VC signals output by the demultiplexing means and converting the VC signals to Administrative Unit (AU) signals by adding AU pointers; and means for inserting SDH section supervisory signals in the AU signals output by the multiplexing means.

11. Optical path signal termination equipment according to claim 9, wherein:

the optical path supervisory signal at the electrical level is added to the optical path signal in the area of the SDH section supervisory signal in the SDH signal format;

the optical path termination means is configured to output the electrical signal with an optical path signal format, and the electrical signal termination means comprises:

demultiplexing means for demultiplexing the electrical signal output by the optical path termination means, thereby converting the electrical signal to a plurality of VC signals;

means for rewriting the optical path supervisory signals at the electrical level contained in the plurality of VC signals output by the demultiplexing means;

multiplexing means for multiplexing the outputs of the rewriting means and converting the outputs of the rewriting means to AU signals by adding AU pointers; and means for adding SDH section supervisory signals to the AU signals output by the multiplexing means.

12. Optical path signal termination equipment according to claim 9, further comprising:

a plurality of optical path termination means;

a plurality of demultiplexing means respectively provided in correspondence with the plurality of optical path termination means; and a switching circuit for switching signals provided between the demultiplexing means and a multiplexing means.

13. Optical path signal termination equipment according to claim 9, further comprising:

a plurality of optical path termination means;

a plurality of demultiplexing means; and a switching circuit for switching signals provided between outputs of the plurality of optical path termination means and inputs of the plurality of demultiplexing means.

14. Optical path signal termination equipment according to claim 9, wherein the optical path termination means comprises means for separating the optical path supervisory signal from the optical path signal at an optical level, the optical path supervisory signal at the optical signal being separate from the optical path supervisory signal at the electrical level.

15. Optical path signal terminator comprising:

a plurality of optical path signal termination equipment according to any of claims 1 to 8 wherein, an optical carrier of different wavelengths is allocated to each optical path signal termination equipment; and wavelength multiplexing means for wavelength division multiplexing the output optical signals of the optical path termination means of the optical path signal termination equipment and sending the multiplexed output optical signals to an optical transmission line.

16. Optical path signal terminator comprising:

a plurality of optical path signal termination equipment according to any of claims 9 to 14 wherein, an optical carrier of different wavelengths is allocated to each optical path signal termination equipment; and wavelength demultiplexing means for demultiplexing a wavelength multiplexed optical signal from an optical transmission line and outputting results to the optical path signal termination equipment.

* * * * *